United States Patent
Yang et al.

(10) Patent No.: US 12,381,662 B2
(45) Date of Patent: Aug. 5, 2025

(54) CONTROL CHANNEL CARRIER SWITCHING FOR SUBSLOT-BASED CELLS

(71) Applicant: QUALCOMM Incorporated, San Diego, CA (US)

(72) Inventors: Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 389 days.

(21) Appl. No.: 17/947,571

(22) Filed: Sep. 19, 2022

(65) Prior Publication Data

US 2023/0142481 A1    May 11, 2023

Related U.S. Application Data

(60) Provisional application No. 63/278,402, filed on Nov. 11, 2021.

(51) Int. Cl.
*H04L 1/1829* (2023.01)
*H04W 72/23* (2023.01)

(52) U.S. Cl.
CPC .......... *H04L 1/1854* (2013.01); *H04L 1/1861* (2013.01); *H04W 72/23* (2023.01)

(58) Field of Classification Search
CPC ..... H04L 1/1861; H04L 1/1854; H04W 72/23
USPC ......................................................... 370/329
See application file for complete search history.

(56) References Cited

U.S. PATENT DOCUMENTS 10,873,936 B2 * 12/2020 Huang ................... H04L 5/0098
10,952,231 B2 *  3/2021 Liou ....................... H04W 76/27
2019/0349180 A1 * 11/2019 Lu .......................... H04L 27/2607

FOREIGN PATENT DOCUMENTS

WO    2022206933 A1    10/2022

OTHER PUBLICATIONS

FGI., et al., "Discussion on UE feedback enhancements for HARQ-ACK", 3GPP TSG RAN WG1 #106bis-e, R1-2109822, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, 9 Pages, XP052058751, Section 2.3.

(Continued)

*Primary Examiner* — Peter G Solinsky

(74) *Attorney, Agent, or Firm* — Patterson+ Sheridan, L.L.P.

(57) ABSTRACT

Certain aspects of the present disclosure provide techniques for facilitating control channel carrier switching for subslot-based cell. A method that may be performed by a user equipment (UE) includes receiving signaling configuring a first cell with physical uplink control channel (PUCCH) resources, configuring a second cell with PUCCH resources, and configuring at least one of the first cell or the second cell for subslot-based hybrid automatic repeat request acknowledgment (HARQ-ACK) reporting, receiving a physical downlink control channel (PDCCH), selecting, based on target PUCCH cell switching information, the first cell or the second cell as a target PUCCH cell for transmitting a PUCCH with HARQ-ACK feedback for the PDCCH or a physical downlink shared channel (PDSCH) scheduled by the PDCCH, and transmitting the PUCCH with the HARQ-ACK feedback in a subslot or slot on the target PUCCH cell, in accordance with the selection.

36 Claims, 14 Drawing Sheets

(56) References Cited

OTHER PUBLICATIONS

Huawei., et al., "UE Feedback Enhancements for HARQ-ACK", 3GPP TSG RAN WG1 Meeting #106bis-e, R1-2108726, 3rd Generation Partnership Project, Mobile Competence Centre, 650, Route Des Lucioles, F-06921 Sophia-Antipolis Cedex, France, vol. RAN WG1, No. e-Meeting, Aug. 11, 2021-Aug. 19, 2021, Oct. 2, 2021, 19 Pages, XP052057823, Section 2.3.3.

International Search Report and Written Opinion—PCT/US2022/044106—ISA/EPO—Dec. 16, 2022.

Moderator (Nokia): "Final Moderator Summary on HARQ-ACK Feedback Enhancements for NR Rel-17 URLLC/IIoT", 3GPP TSG-RAN WG1 Meeting #106bis-e, R1-2110562, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 22, 2021, pp. 1-269, XP052065833, p. 157-p. 160.

NEC: "UE Feedback Enhancements for HARQ-ACK", 3GPP TSG RAN WG1 #106-e, R1-2107156, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 6, 2021, 15 Pages, XP052033461, Sections 2 and 5.

\* cited by examiner

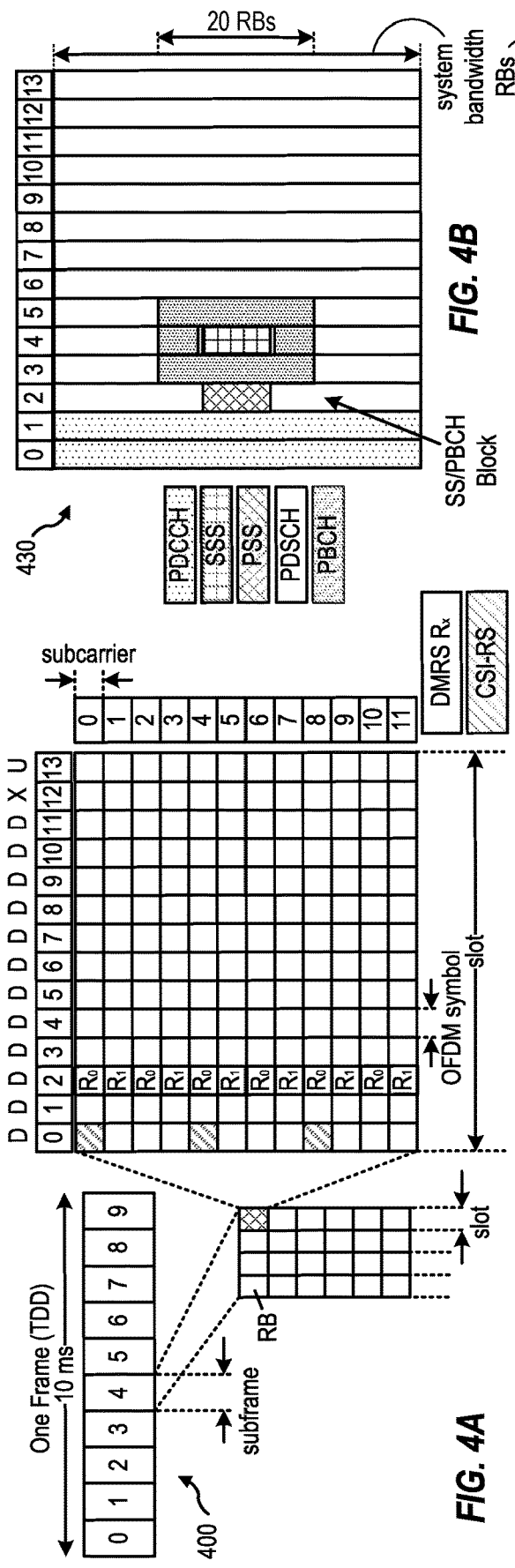
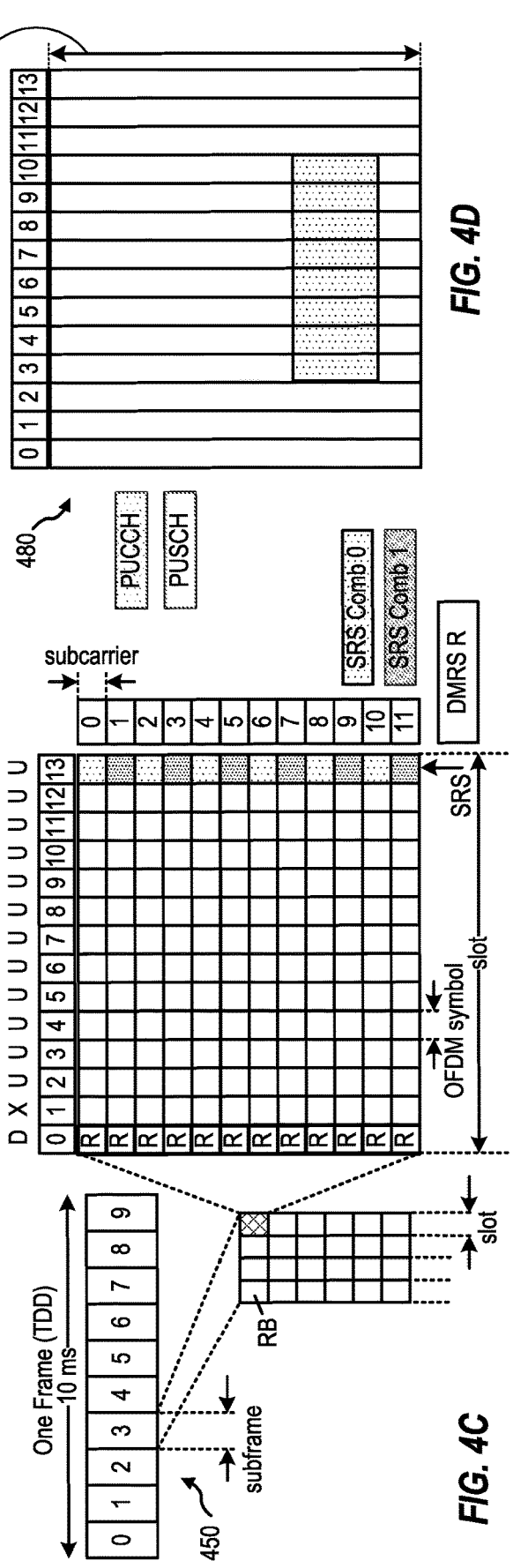
FIG. 4A   FIG. 4B   FIG. 4C   FIG. 4D

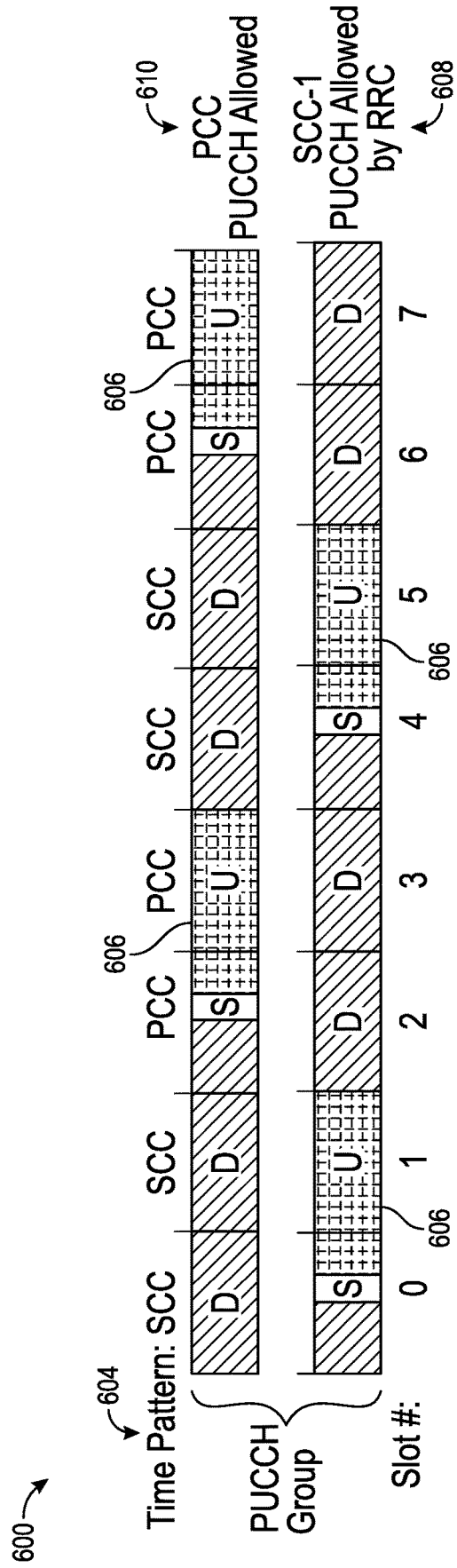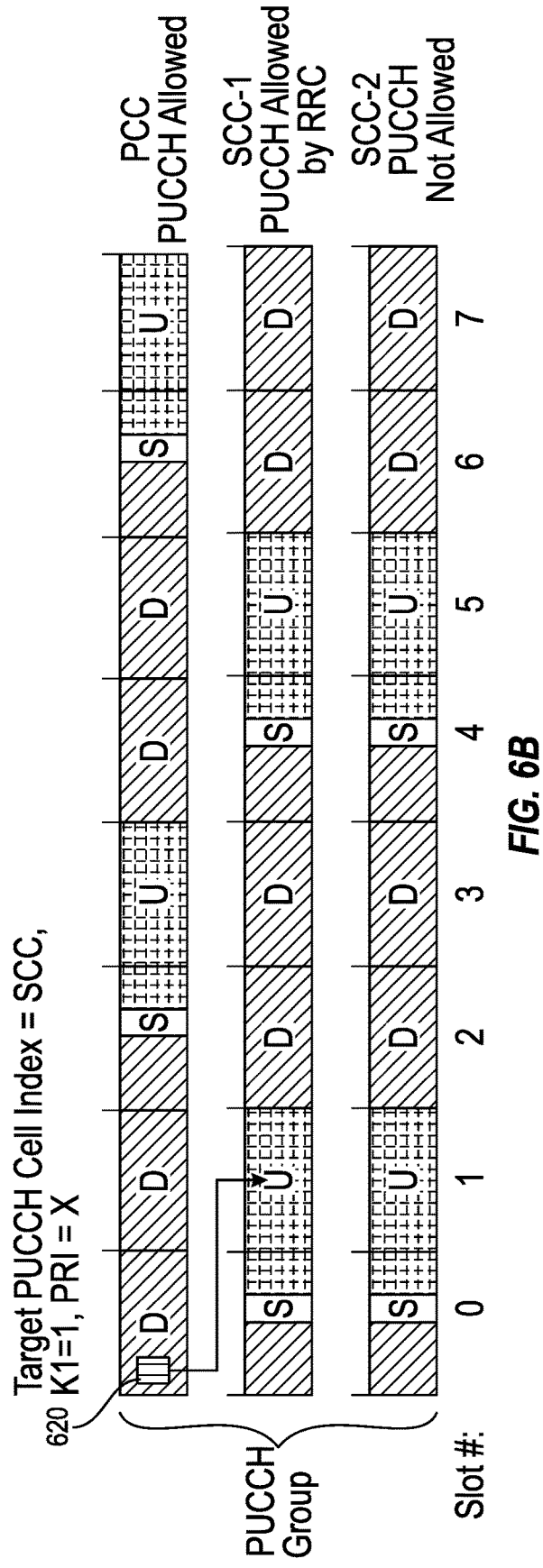
FIG. 6A
FIG. 6B

CONTROL CHANNEL CARRIER SWITCHING FOR SUBSLOT-BASED CELLS

CROSS-REFERENCE TO RELATED APPLICATIONS

This application claims benefit of and priority to U.S. Provisional Application No. 63/278,402, filed Nov. 11, 2021, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for facilitating control channel carrier switching for subslot-based cells.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving signaling configuring a first cell with physical uplink control channel (PUCCH) resources, configuring a second cell with PUCCH resources, and configuring at least one of the first cell or the second cell for subslot-based hybrid automatic repeat request acknowledgment (HARQ-ACK) reporting, receiving a physical downlink control channel (PDCCH), selecting, based on target PUCCH cell switching information, the first cell or the second cell as a target PUCCH cell for transmitting a PUCCH with HARQ-ACK feedback for the PDCCH or a physical downlink shared channel (PDSCH) scheduled by the PDCCH, and transmitting the PUCCH with the HARQ-ACK feedback in a subslot or slot on the target PUCCH cell, in accordance with the selection.

Another aspect provides a method for wireless communication by a network entity. The method includes transmitting, to a user equipment (UE), signaling configuring a first cell with physical uplink control channel (PUCCH) resources, configuring a second cell with PUCCH resources, and configuring at least one of the first cell or the second cell for subslot-based hybrid automatic repeat request acknowledgment (HARQ-ACK) reporting, transmitting a physical downlink control channel (PDCCH) to the UE, selecting, based on target PUCCH cell switching information, the first cell or the second cell as a target PUCCH cell for monitoring for a PUCCH with HARQ-ACK feedback for the PDCCH or a physical downlink shared channel (PDSCH) scheduled by the PDCCH, and monitoring for the PUCCH with the HARQ-ACK feedback in a subslot or slot on the first cell or the second cell, in accordance with the selection.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 4A, 4B, 4C, and 4D depict various example aspects of data structures for a wireless communications network.

FIG. 6A illustrates an example periodic time pattern that may used by a UE for transmitting PUCCH on different carriers associated with different cells.

FIG. 6B illustrates dynamic indication for PUCCH carrier switching that may used by a UE for transmitting PUCCH on different carriers associated with different cells.

DETAILED DESCRIPTION

Figure 1:
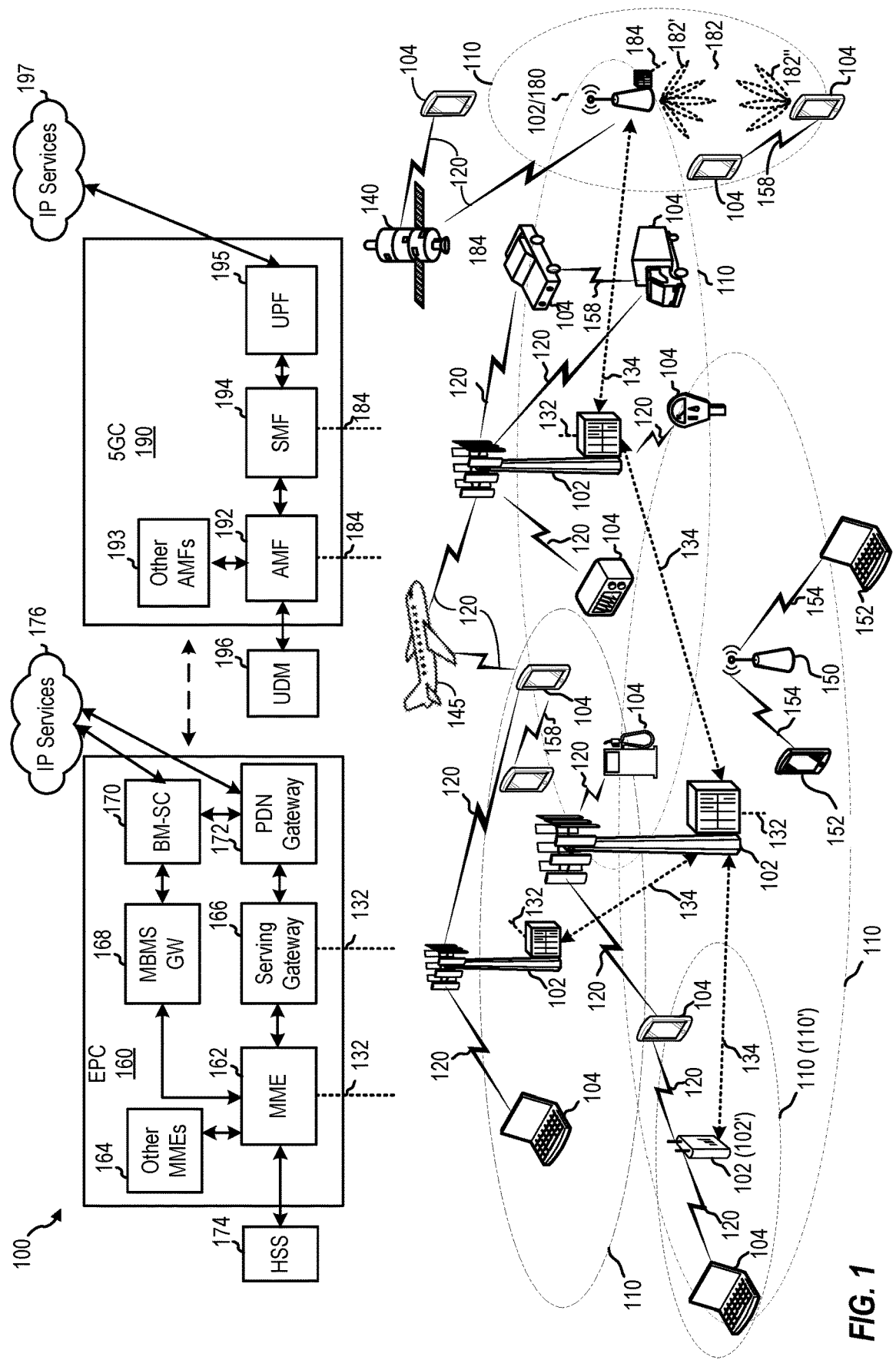
FIG. 1 depicts an example wireless communications network.

Aspects of the present disclosure provide apparatuses, methods, processing systems, and computer-readable mediums for facilitating physical uplink control channel (PUCCH) carrier switching for subslot-based cells.

When communicating in a wireless network, a user equipment (UE) (e.g., UE 104) may send hybrid automatic repeat request (HARD) feedback (e.g., acknowledgement (ACK) information and/or negative acknowledgement (NACK) information) to a network entity in uplink control information (UCI) via a physical uplink control channel (PUCCH) based on a HARQ-ACK codebook. The HARQ-ACK feedback may be generated in response to information received on a physical downlink control channel (PDCCH) and/or physical downlink shared channel (PDSCH).

Traditionally, only one HARQ-ACK feedback transmission may be permitted per slot in fifth generation (5G) new radio (NR). However, more recently, subslot-based HARQ-ACK feedback reporting may be supported for low-latency HARQ-ACK feedback. Subslot-based HARQ-ACK feedback may involve splitting a regular slot (e.g., including 14 OFDM symbols) into multiple subslots. The UE may then be permitted to send a HARQ-ACK feedback transmission in each subslot.

In some cases, techniques known as PUCCH carrier switching may be used when transmitting PUCCH, which allows a UE to switch between at most two UL cells in a PUCCH group for transmitting PUCCH. In some cases, one of the two UL cells may be the primary cell (PCell) or primary secondary cell (PScell) and the other cell may be a secondary cell (Scell). In some cases, the PCell and SCell used for transmitting PUCCH may be associated with different numerologies (e.g., subcarrier spacings). Generally, different numerologies do not have a significant impact on dynamic PUCCH carrier switching when dynamic indication is used since the UE may simply follow the numerology of the dynamically indicated PUCCH target cell. However, different numerologies in the PCell and SCell may cause certain issues with semi-static PUCCH carrier switching.

For example, one issue with PUCCH carrier switching arises when the numerology or subcarrier spacing of the PCell is less than the SCell, resulting in multiple SCell slots overlapping with one PCell slot. In this scenario, when a UE is configured to transmit PUCCH on the SCell, the UE may not know which slot of the multiple SCell slots to transmit the PUCCH in. Similarly, the network entity may not know which slot the UE will be transmitting the PUCCH. As a result, there may be cases in which the UE transmits the PUCCH in one SCell slot but the network entity monitors for the PUCCH in another SCell slot, thereby missing reception of the PUCCH. In such cases, the UE may have to retransmit the PUCCH, unnecessarily consuming additional time-frequency resources within the wireless network and power resources at the UE and network entity. In other cases, the network entity may monitor both SCell slots to ensure reception of the PUCCH. However, in this case, the network entity may unnecessarily consume power resources having to monitor both SCell slots.

Another issue with PUCCH carrier switching arises when the numerology or subcarrier spacing of the PCell is greater than the SCell, resulting in multiple PCell slots overlapping with one SCell slot. In this scenario, there may be case in which a first PUCCH is configured within a first PCell slot overlapping with the one SCell slot as well as a second PUCCH configured within a second PCell slot overlapping with the one SCell slot. When a target cell for both configured PUCCHs is the SCell, the UE may need to combine/multiplex one large PUCCH within the one SCell slot, which may be challenging for the UE to accomplish.

As can be seen, the use of subslots may present issues when determining which slots/cells to transmit PUCCH including HARQ-ACK feedback. Therefore, aspects of the present disclosure provide techniques for facilitating control channel carrier switching for subslot-based cells. More specifically, aspects of the present disclosure provide techniques for enabling PUCCH carrier switching between two PUCCH cells in a same PUCCH group, in which at least one of the cell is configured with subslot-based HARQ-ACK feedback reporting.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
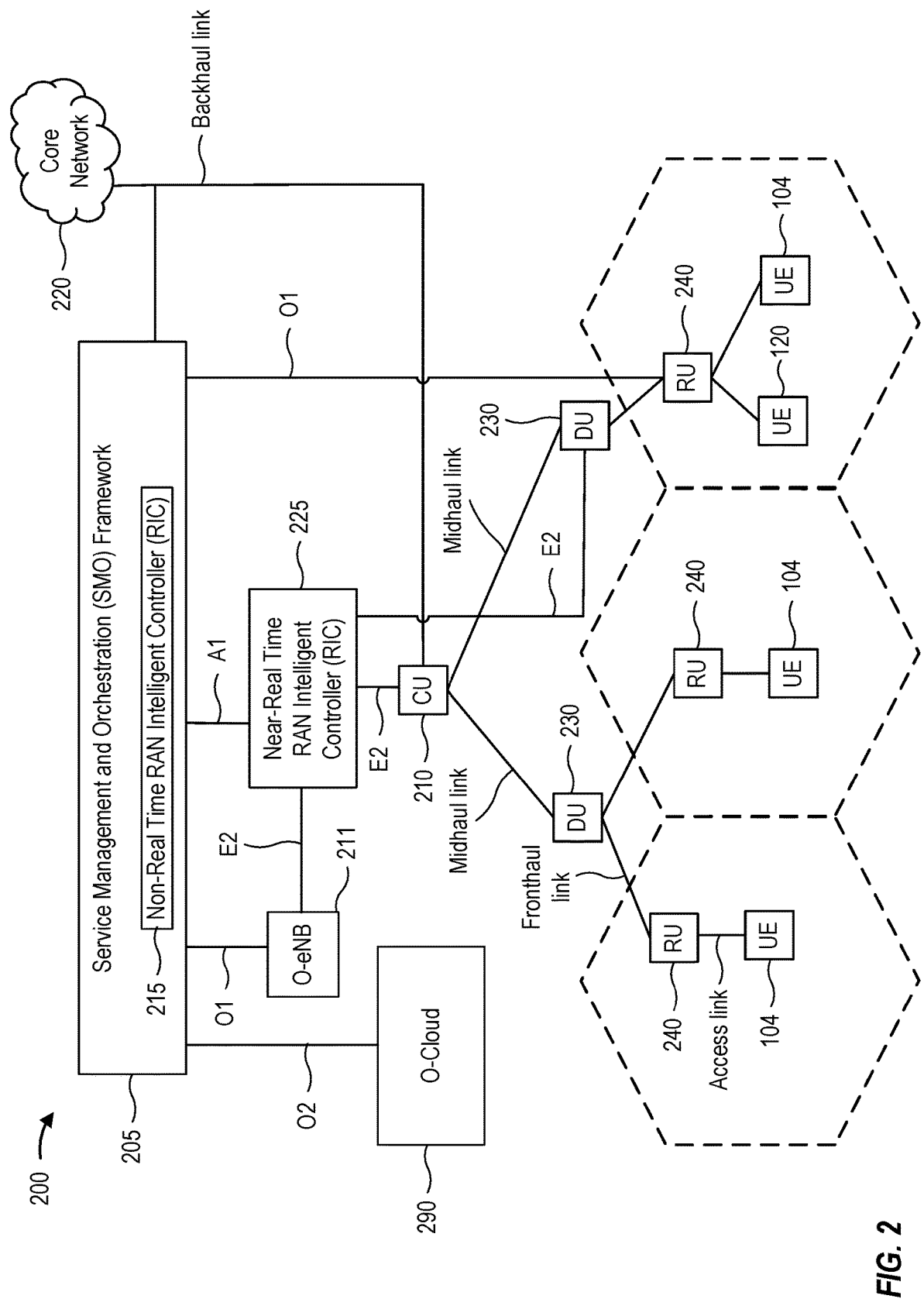
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-71,000 MHz, which is sometimes referred to (interchangeably) as a "millimeter wave" ("mmW" or "mmWave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
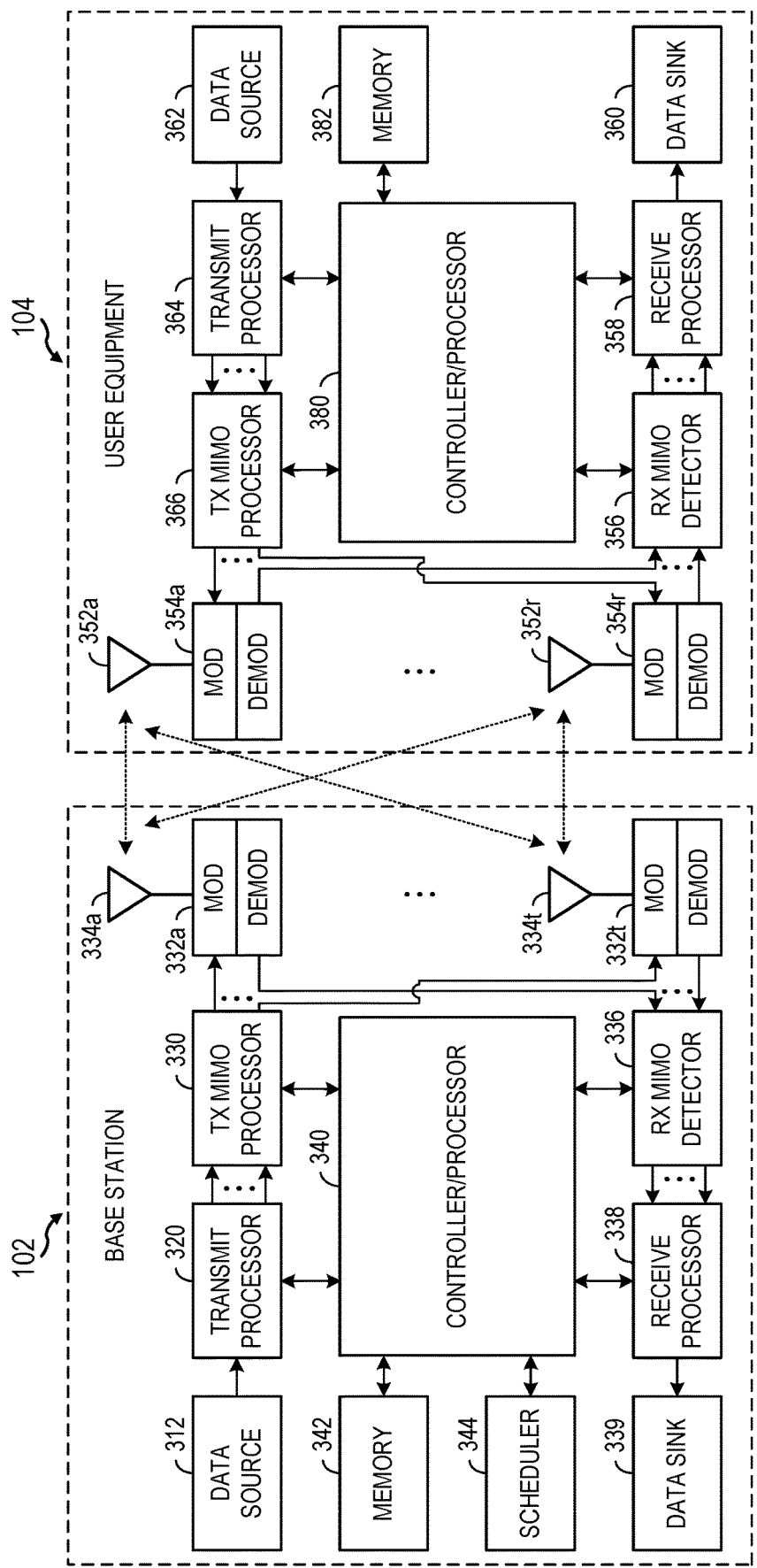
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 6. As such, the numerology μ=0 has a subcarrier spacing of 15 kHz and the numerology μ=6 has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Control Channel Carrier
Switching for Sub-Slot-Based Cells

When communicating in a wireless network (e.g., wireless communication network 100), a user equipment (UE) (e.g., UE 104) may send hybrid automatic repeat request (HARQ) feedback (e.g., acknowledgement (ACK) information and/or negative acknowledgement (NACK) information) to a network entity (e.g., BS 102) in uplink control information (UCI) via a physical uplink control channel (PUCCH) based on a HARQ-ACK codebook. The HARQ-ACK feedback may be generated in response to information received on a physical downlink control channel (PDCCH) and/or physical downlink shared channel (PDSCH). Traditionally, only one HARQ-ACK feedback transmission may be permitted per slot in fifth generation (5G) new radio (NR).

However, more recently, subslot-based HARQ-ACK feedback reporting may be supported for low-latency HARQ-ACK feedback. Subslot-based HARQ-ACK feedback may involve splitting a regular slot (e.g., including 14 OFDM symbols) into multiple subslots. The UE may then be permitted to send a HARQ-ACK feedback transmission in each subslot. The UE may be configured with a subslot structure for transmitting HARQ-ACK feedback on a PUCCH via the parameter "subslotLength-ForPUCCH," which indicates a number of symbols per slot for PUCCH transmission. Two configurations may be possible: (1) two subslots each with seven symbols, and (2) seven subslots each with 2 symbols.

In some cases, when providing HARQ-ACK feedback, the PUCCH in which the HARQ-ACK feedback is to be transmitted may be determined by the UE based on a PDSCH-to-HARQ-ACK slot offset (K1). In some cases, when using a subslot structure, a granularity or unit (e.g., slots or subslots) of the K1 offset may be the same as the configured subslot length (e.g., specified by subslotLength-ForPUCCH) for a given HARQ-ACK codebook. Accordingly, K1 starts from an UL subslot in which an ending symbol of a PDSCH lies or overlaps.

Figure 5A:
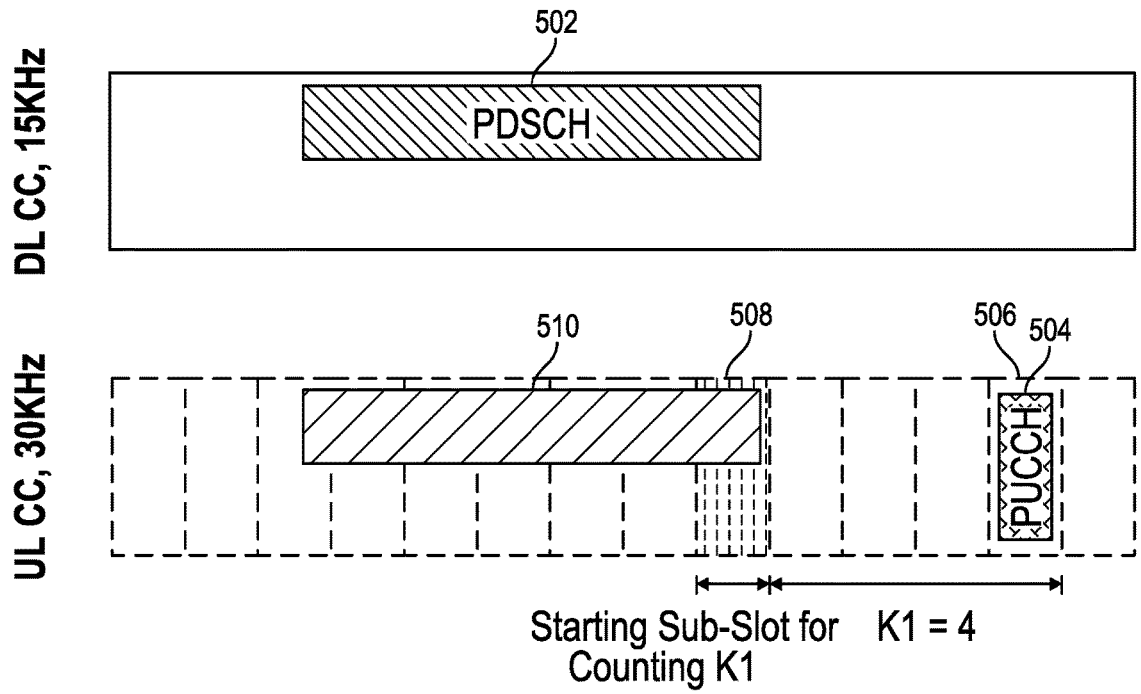
FIG. 5A illustrates a subslot-based slot structure for transmitting a physical uplink control channel (PUCCH).

For example, as shown in FIG. 5A, a UE receives a PDSCH 502 on a one or more slots of a downlink (DL) component carrier (CC). As shown at 510, the PDSCH 502 overlaps a number of subslots in an uplink (UL) carrier via which feedback associated with the PDSCH 502 will be transmitted. After receiving the PDSCH 502, the UE determines which subslot of the UL CC in which to transmit a PUCCH including the HARQ-ACK feedback for the PDSCH 502, which, as noted, is based on a PDSCH-to-HARQ-ACK slot offset (K1). In FIG. 5A, K1 is assumed to be four, indicating to the UE that a PUCCH 504 should be transmitted in the slot 506, which occurs four subslots after subslot 508 in which the PDSCH ends.

Additionally, in some cases, when using a subslot structure the UE may be configured by the network entity with up to two HARQ-ACK codebooks. For example, in some cases, the UE may be configured with two slot-based HARQ-ACK codebooks, two subslot-based HARQ-ACK codebooks, or one slot-based HARQ-ACK codebook and one subslot-based HARQ ACK codebook. In some cases, resources (e.g., time-frequency resources) for transmitting HARQ-ACK feedback on PUCCH may be contained within the boundaries defined by the subslots. Additionally, PUCCH resources for the two HARQ-ACK codebooks may be configured separately.

Figure 5B:
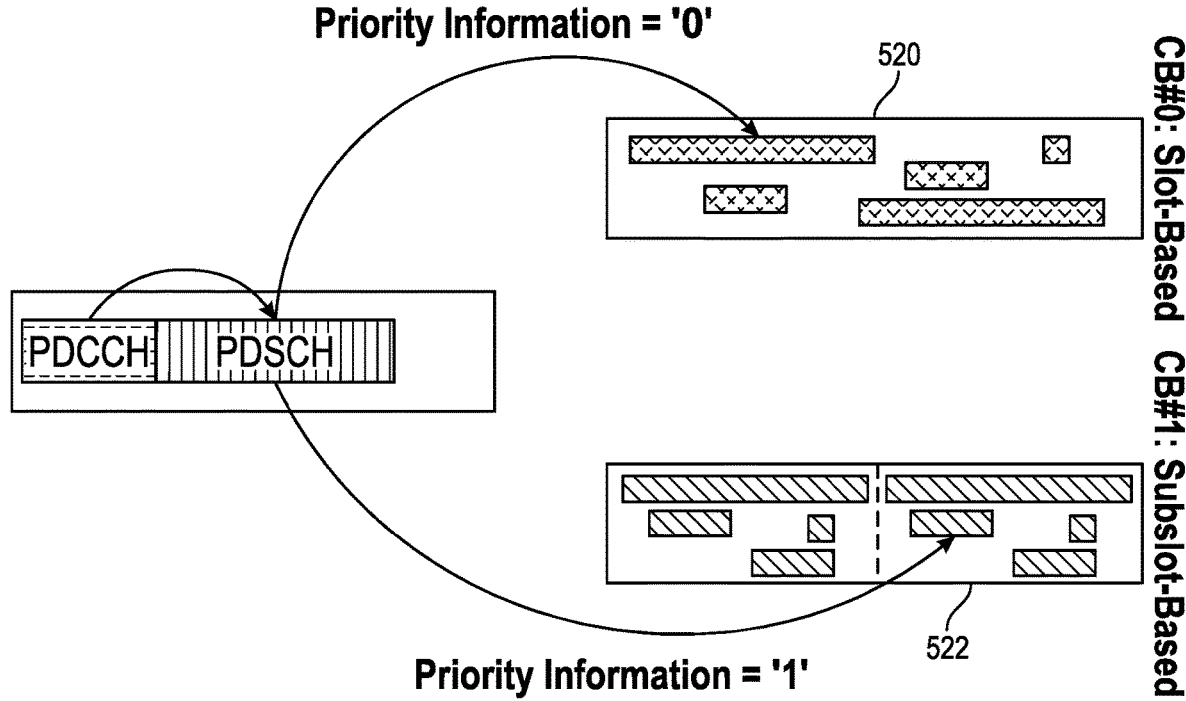
FIG. 5B illustrates example priority based PUCCH transmission.

In some cases, a priority indicator field in downlink control information (DCI) format 1_1 and 1_2 may be used to indicate which codebook should be used for reporting the HARQ-ACK feedback. For example, in some cases, as shown in FIG. 5B, when the UE receives a PDCCH including a DCI message having a priority indicator field that indicates low-priority HARQ-ACK feedback (e.g., priority indicator field=0), the UE may use a slot-based HARQ-ACK codebook to transmit HARQ-ACK feedback in a PUCCH according to a slot-based structure 520. Conversely, when the priority indicator field in the DCI indicates high-priority HARQ-ACK feedback (e.g., priority indicator field=1), the UE may use a sub-slot-based HARQ-ACK codebook to transmit HARQ-ACK feedback in a PUCCH according to a subslot-based structure 522. In some cases, if the priority indicator field is not configured (e.g., the DCI does not include the priority indicator field), then a first HARQ-ACK codebook (e.g., slot-based) may be used by the UE for reporting the HARQ-ACK feedback.

In some cases, carrier aggregation (CA) may be used in wireless communication networks (e.g., wireless communication network 100) to increase bandwidth by aggregating one or more component carriers associated with different frequency bands. When CA is used, a UE may communicate with a plurality of serving cells, one serving cell for each aggregated component carrier. In some cases, component carriers on different frequency bands may experience different path losses and, as a result, coverage of the serving cells may differ from each other. In some cases, a radio resource control (RRC) connection may only by managed by one cell, such as a primary serving cell (PCell), and served by a primary component carrier (PCC), such as downlink and uplink PCCs. Other component carriers may be referred to as secondary component carriers (e.g., DL and UL SCC) and may be associated secondary serving cells. The SCCs may be added and removed as required, while the PCC may only be changed at handover.

In some cases, when communicating using CA, the UE may use one or more aggregated component carriers to transmit uplink control information on a PUCCH to a network entity (e.g., BS 102 or a disaggregated BS) of a cell. In some cases, the UE may transmit PUCCH information on one cell (e.g., PCell or primary secondary cell (PSCell)) to a respective network entity. As the number of CA capable UEs and also the number of aggregated carriers increase, the number of PUCCHs and also the PUCCH payload size may increase. Accommodating the PUCCH transmissions on the PCell may lead to a high PUCCH load on the PCell. In some cases, transmitting PUCCH on a secondary cell (Scell) may be used to offload the PUCCH resource from the PCell.

In some cases, more than one PUCCH may be configured, such as a PUCCH on a PCell and another PUCCH on an SCell. In some cases, one, two or more cells may be configured with PUCCH resources for transmitting channel state information (CSI) and/or ACK/NACK information to a network entity. Further, in some cases, cells may be grouped into multiple PUCCH groups and one or more cell within a group may be configured with a PUCCH. In an example configuration, one SCell may belong to one PUCCH group. SCells with a configured PUCCH transmitted to a network entity may be known as a PUCCH SCell, and a cell group with a common PUCCH resource transmitted to the same network entity may be known as a PUCCH group.

In some cases, each PUCCH group may have only one cell that can be used to transmit PUCCH, such as the Pcell in a master cell group (MCG) or the PSCell in a secondary cell group (SCG). Further, in some cases, a techniques known as PUCCH carrier switching may be used when transmitting PUCCH. PUCCH carrier switching allows a UE to switch between at most two UL cells in a PUCCH group for transmitting PUCCH (one of the two UL cells may be the PCell or PScell, the other cell can be Scell). In some cases, the switching of PUCCH carriers may be accomplished via different approaches, such as via a semi-static carrier switch indication or via dynamic carrier switch indication.

When a semi-static carrier switch indication is used, the network entity (e.g., BS 102) may send configuration information to the UE with a periodic time pattern, which indicates a corresponding target cell and/or carrier for PUCCH transmission for each slot of a set of slots within a periodicity. In some cases, the time pattern may be configured with reference to a numerology (e.g., subcarrier spacing) of the PCell. Additionally, in some cases, the UE may interpret a resource for transmitting UCI on the PUCCH based on PUCCH resources configured on the target PUCCH cell. In some cases, this UCI information may include HARQ acknowledgement information corresponding to information received by the UE on PDSCH or on a PDCCH. In such cases, the UE may determine a PDSCH-to-HARQ-ACK slot offset (K1) (e.g., a period of time after receiving a PDSCH and ponding acknowledgement information) for dynamically scheduled HARQ-ACK and for semi-persistent signaling (SPS) ACK/NACK based on the numerology of the PCell (e.g., in case the two PUCCH cells have different numerologies). Additionally, in some cases, the UE may determine a PUCCH resource indicator (PRI) based on PUCCH resources configuration on the target cell for which the PUCCH is to be transmitted.

FIG. 6A illustrates an example periodic time pattern 600 that may used by a UE for transmitting PUCCH on different carriers associated with different cells, such as a PCC associated with a PCell and an SCC associated with an SCell. As noted above, the periodic time pattern 600 indicates a corresponding target cell for PUCCH transmission for each slot of a set of slots within a periodicity. For example, as illustrated in FIG. 6A, a time pattern 604 may be configured by the network entity and may indicate which slots and corresponding component carrier to use to transmit PUCCH. In some cases, as shown in FIG. 6A, the time pattern 604 may comprise the following component carrier pattern: SCC, SCC, PCC, PCC, SCC, SCC, PCC, PCC. In some cases, an ordering of the time pattern 604 corresponds to an ordering of slot numbers. Accordingly, for example, as shown in FIG. 6A the time pattern 604 indicates to the UE to transmit a PUCCH 606 via the SCC 608 in slots 0 and 1 and via the PCC 610 in slots 2 and 3. The time pattern 604 then repeats itself with the UE being configured to switch to transmitting the PUCCH 606 via the SCC 608 in slots 4 and 5 and via the PCC 610 in slots 6 and 7.

When a dynamic carrier switch indication is used, the network entity may dynamically indicate (e.g., using one bit in DCI) the target cell for PUCCH transmission. For example, the DCI may indicate one of the PCell/PCC or the SCell/SCC to transmit the PUCCH. In such cases, the UE may determine a PDSCH-to-HARQ-ACK slot offset (K1) based on the target PUCCH cell indicated by the dynamic indication in the DCI. Additionally, PRI may be determine by the UE based on a PUCCH resource configuration on the target cell indicated by the dynamic indication in the DCI.

FIG. 6B illustrates dynamic indication for PUCCH carrier switching that may used by a UE for transmitting PUCCH on different carriers associated with different cells, such as a PCC associated with a PCell and an SCC associated with an SCell. For example, as shown in FIG. 6B, the UE may receive a DCI 620 including a dynamic indication indicating a target cell index, such as an index of the SCC/SCell, for transmitting a PUCCH. Based on the indication of the SCC/SCell, the UE may determine the PDSCH-to-HARQ-ACK slot offset (K1) (e.g., as shown K1=1 in FIG. 6B) based on a numerology of the SCC/SCell. As shown in FIG. 6B, K1 may be assumed to be 1, indicating that the PUCCH on the SCC/SCell will begin one slot after the slot in which the DCI 620 including the dynamic indication is received. For example, as can be seen, the DCI 620 indicating PUCCH on the SCC/SCell is received in slot 0 and, thus, the UE determines that the PUCCH on the SCC/SCell begin in slot 1 by determining K1=1 based on the SCC/Scell.

In some cases, the PCell and SCell used for transmitting PUCCH may be associated with different numerologies (e.g., subcarrier spacings). Generally, different numerologies do not have a significant impact on dynamic PUCCH carrier switching when dynamic indication is used since the UE may simply follow the numerology of the dynamically indicated PUCCH target cell. However, different numerologies in the PCell and SCell may cause certain issues with semi-static PUCCH carrier switching.

Figure 7A:
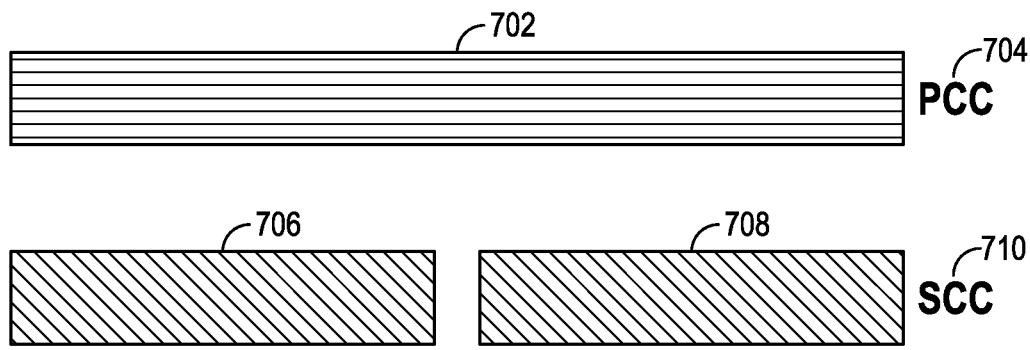
FIGS. 7A and 7B illustrate different slot and subslot configurations for different cells.
Figure 7B:
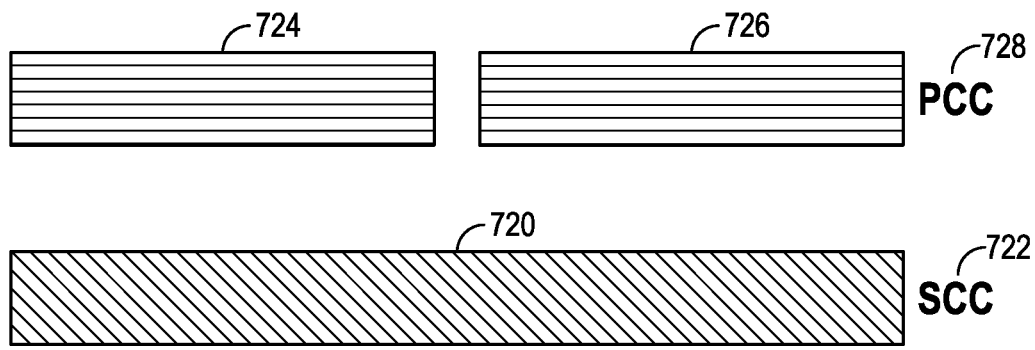

For example, a first issue with semi-static PUCCH carrier switching arises when the numerology or subcarrier spacing of the PCell is less than the SCell. For example, in this case, as shown in FIG. 7A, a slot 702 of the PCC 704 associated with the PCell is longer than those of an SCC 710 associated with the SCell, resulting in multiple SCell slots, such as slot 706 and slot 708, overlapping with the one PCell slot 702. The difference in numerologies of the PCell and SCell can cause issues when the semi-static time pattern indicates that the SCell/SCC is to be used to PUCCH transmission since the PDSCH-to-HARQ-ACK slot offset (K1) used for determining the slot for the PUCCH transmission is always based on the PCell for semi-static PUCCH carrier switching indication. For example, since one PCell slot (e.g., slot 702) overlaps with two SCell slots (e.g., slot 706 and slot 708) and since a granularity of K1 is one PCell slot or two SCell slots, K1 may not be able to indicate one of the SCell slots in which to perform the PUCCH transmission.

In some cases, to help resolve this issue, when the semi-static time pattern for PUCCH carrier switching indicates that the target cell for PUCCH transmission is the Scell and when multiple SCell slots overlap with one PCell slot, the UE may be configured to use a first SCell slot that overlaps with the PCell slot. In other cases, the UE may be configured to use a relative slot-offset within a reference cell slot, where the relative slot offset is configured in the time domain pattern (e.g., the time domain pattern includes the parameters "cell index" and "slot offset" for each reference cell slot). For example, if the relative slot-offset is configured to be zero, the UE may always use the first SCell slot that overlaps with the PCell slot, while when the relative slot-offset is configured to be one, the UE may always use the second SCell slot that overlaps with the PCell stop, and so on.

A second issue with semi-static PUCCH carrier switching arises when the numerology or subcarrier spacing of the PCell is greater than the SCell. For example, in this case, a slot of the PCell is shorter than the slot of the SCell, resulting in multiple PCell slots (e.g., two) overlapping with one SCell slot. For example, as shown in FIG. 6B, a slot 720 of the SCC 722 associated with the SCell overlaps with the slot 724 and the slot 726 of the PCC 728 associated with the PCell. In some cases, under this scenario, there may be case in which a first PUCCH is configured within a first PCell slot (e.g., slot 724) overlapping with the one SCell slot (e.g., slot 720) as well as a second PUCCH configured within a second PCell slot (e.g., slot 726) overlapping with the one SCell slot (e.g., 720). When a target cell for both configured PUCCHs is the SCell, the UE may need to combine/multiplex one large PUCCH within the one SCell slot, which may be challenging for the UE to accomplish. Therefore, to help avoid these problems, in some cases, PUCCH carrier switching may not be allowed in the scenarios in which the slot of the SCell is longer than the slot of the PCell.

As noted above, there may be instances in which subslot-based PUCCH HARQ-ACK feedback reporting may be configured, such as to enable low-latency HARQ-ACK feedback. However, the aspects described above relate to PUCCH carrier switching, which assumes slot-based PUCCH HARQ-ACK feedback reporting for the PCell and the SCell. As a result, currently PUCCH carrier switching may not be applicable/used by a UE if the UE is configured with subslot-based PUCCH HARQ-ACK reporting (e.g., via subslotLengthForPUCCH) on either the PCell or the SCell since subslots may present issues when determining which slots/cells to transmit the HARQ-ACK feedback in. Therefore, aspects of the present disclosure provide techniques for facilitating control channel carrier switching for subslot-based cells. More specifically, aspects of the present disclosure provide techniques for enabling PUCCH carrier switching between two PUCCH cells in a same PUCCH group, in which at least one of the cell is configured with subslot-based HARQ-ACK feedback reporting.

Figure 8:
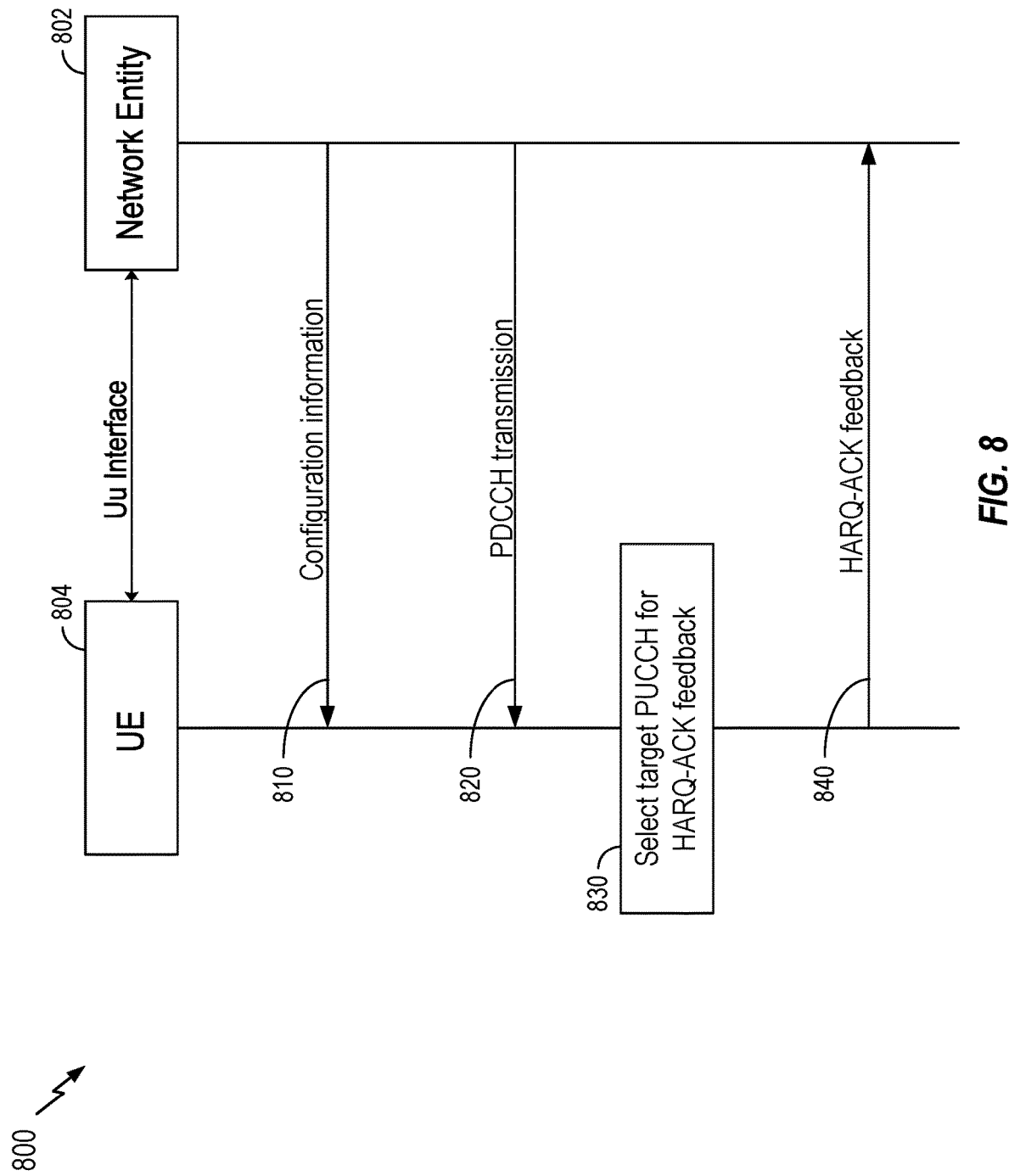
FIG. 8 depicts a process flow for communications in a network between a network entity and a user equipment for facilitating control channel carrier switching for subslot-based cells.

Example Call Flow Illustrating Operations for
Facilitating Control Channel Carrier Switching for
Subslot-Based Cells FIG. 8 depicts a process flow illustrating operations 800 for communications in a network between a network entity 802 and a user equipment (UE) 804 facilitating control channel (e.g., PUCCH) carrier switching for subslot-based cells. In some aspects, the network entity 802 may be an example of the BS 102 depicted and described with respect to FIGS. 1 and 3 or a disaggregated base station depicted and described with respect to FIG. 2. Similarly, the UE 804 may be an example of UE 104 depicted and described with respect to FIGS. 1 and 3. However, in other aspects, UE 104 may be another type of wireless communications device and BS 102 may be another type of network entity or network node, such as those described herein.

As shown, operations 800 begin in step 810 with the UE 804 receiving signaling, such as configuration information from the network entity 802. In some cases, the UE 804 may communicate with the network entity 802 via a first cell using a PCC and via a second cell using an SCC. As such, in some cases, the signaling configures the first cell with PUCCH resources. The signaling may also configure the second cell with PUCCH resources. The signaling may also configure at least one of the first cell or the second cell for subslot-based HARQ-ACK feedback reporting. In some cases, the first cell comprises a PCell or PSCell. Additionally, in some cases, the second cell comprises an SCell.

Thereafter, as shown in step 820, the UE 804 receives a PDCCH transmission from the network entity 802. In some cases, the PDCCH transmission may include scheduling information for a PDSCH) transmission to be transmitted to the UE 804.

Thereafter, as shown at 830, the UE 804 selects, based on target PUCCH cell switching information, the first cell or the second cell as a target PUCCH cell for transmitting a PUCCH that includes HARQ-ACK feedback for the PDCCH or a PDSCH scheduled by the PDCCH.

Thereafter, as shown in step 830, the UE 804 transmits the PUCCH including the HARQ-ACK feedback in a subslot or slot on the target PUCCH cell, in accordance with the selection.

In some cases, the target PUCCH cell switching information used to select the target PUCCH cell in step 830 may be received from the network entity 802 and may include a semi-static carrier switch indication or a dynamic carrier switch indication. For example, in some cases, the target PUCCH cell switching information includes an indication of the target PUCCH cell via DCI (e.g., dynamic carrier switch indication). As such, each received DCI may indicate which target PUCCH cell to use to transmit the PUCCH and HARQ-ACK feedback for each PDCCH or PDSCH scheduled by the PDCCH.

In other cases, the target PUCCH cell switching information includes a semi-static time pattern for target PUCCH cell switching (e.g., semi-static carrier switch indication). The semi-static time pattern for target PUCCH cell switching may indicate a pattern of time periods and corresponding target PUCCH cells to use during each respective time period to transmit the PUCCH.

In some cases, the signaling received in step 810 in FIG. 8 may configure both the first cell and the second cell for subslot-based HARQ-ACK reporting. Additionally, in some cases, the first cell and second cell have different subslot length configurations for a given HARQ-ACK codebook. For example, in some cases, the signaling received in step 810 may include separate subslotLength-ForPUCCH configurations for a given HARQ-ACK codebook for the first cell and the second cell. In some cases, this option may work for both dynamic carrier switch indication as well as semi-static carrier switch indication.

In some cases, the signaling received in step 810 in FIG. 8 configures one of the first cell or the second cell for subslot-based HARQ-ACK reporting and the other one of the first cell or the second cell for slot-based HARQ-ACK reporting. In some aspects, this configuration may be useful when semi-static carrier switching is used. For example, in some cases, the signaling received in step 810 in FIG. 8 may configure the first cell for subslot-based HARQ-ACK reporting and may configured the second cell for slot-based HARQ-ACK reporting. In such cases, the signaling may only include a subslotLength-ForPUCCH configurations for the first cell but not for the second cell.

In the case where the first cell is configured for subslot-based HARQ-ACK reporting, the PUCCH including the HARQ-ACK feedback transmitted in step 840 by the UE 804 may be transmitted in accordance with a HARQ-ACK feedback timing value, such as the PDSCH-to-HARQ-ACK slot offset (K1), based on a subslot length configured for the first cell. More specifically, for example, the UE 804 may follow the subslot length configured for the first cell (e.g., PCell) to determine a granularity of K1.

In some cases, when semi-static carrier switching is used, the UE 804 may select the target PUCCH cell based on a time pattern for semi-static PUCCH cell switching. For example, the UE 804 may determine the granularity of K1 based on a slot/subslot length configured for the first cell, which may be used by the UE 804 to transmit the PUCCH with the HARQ-ACK feedback at 840 in FIG. 8. The UE 804 may then determine the slot/subslot for transmitting the PUCCH with the HARQ-ACK feedback based on K1 and the slot/subslot duration for the first cell. In some cases, when the first cell is configured as slot-based for PUCCH transmission and the second cell is configured as subslot-based for PUCCH transmission, the granularity may be based on a slot configured for first cell. Thereafter, the UE 804 may select the target PUCCH cell for transmitting the PUCCH with the HARQ-ACK feedback based on the time pattern for semi-static PUCCH cell switching and the determined slot/subslot.

Figure 9A:
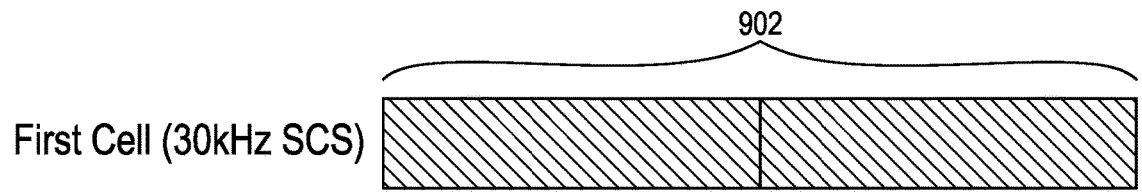
FIGS. 9A and 9B illustrate slot/subslot configurations for different numerologies associated with a first cell and a second cell

In some cases, a same numerology (e.g., subcarrier spacing) may be used for the first cell and the second cell. For example, as illustrated in FIG. 9A, each of the first cell and the second cell may have a numerology of 30 kilohertz (kHz). In this case, as shown, each slot 902 (e.g., a 1 millisecond slot) of the first cell and second cell may include two subslots. In some cases, when the first cell and the second cell have a same numerology, the UE 804 may assume that a subslot length, configured for the first cell, applies to the second cell. In other words, the UE 804 may assume that each of the first cell and the second cell have the same subslot length.

Figure 9B:
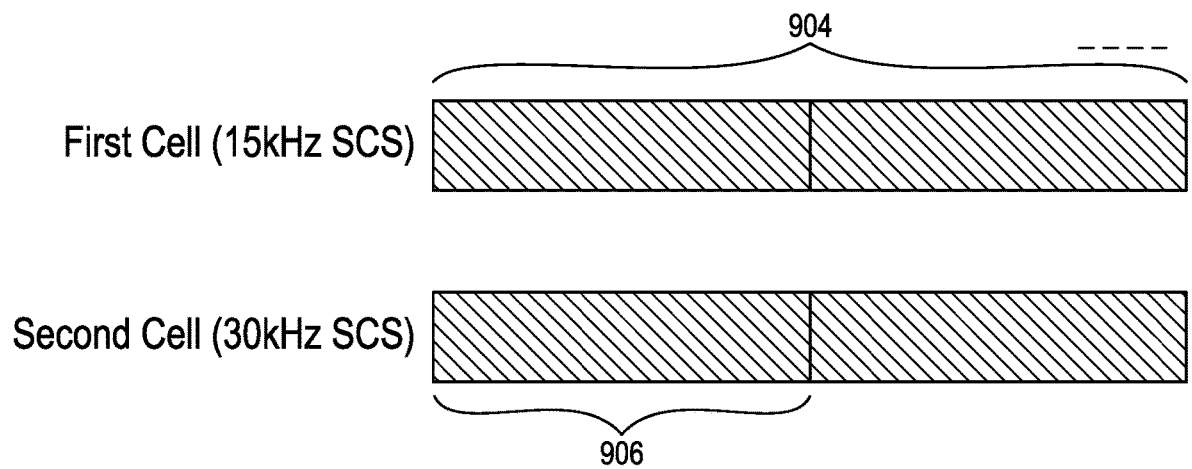

In some cases, different numerologies may be used for the first cell and the second cell. For example, in some cases, the first cell may have a smaller numerology (e.g., subcarrier spacing) than the second cell. For example, as illustrated in FIG. 9B, the first cell may have a numerology of 15 kHz while the second cell may have a numerology of 30 kHz. As a result of the smaller numerology, a slot 904 associated with the first cell may have a duration that is longer than a duration of a slot 906 associated with the second cell. In this case, the UE 804 may determine a slot duration/length of the second cell to be the same as a subslot duration/length of the first cell.

In the case where at least one of the first cell or the second cell is configured with subslotLength-ForPUCCH (e.g., configured for subslot-based transmissions), the UE 804 may not expect a slot/subslot length of the second cell to be longer than a slot/subslot length of the first cell. This may occur in different scenarios. For example, in some cases, when the first cell is configured with subslotLength-ForPUCCH (e.g., the first cell is configured as subslot-based) and the second cell is configured as slot-based, the UE 804 may not expect the second cell to have a larger slot length than the first cell. That is, in this case, a slot length of the second cell (e.g., measured in time) may not be longer than the subslot length of the first cell. In other words, when the first cell is configured for subslots and the second cell is configured for slots, the UE 804 does not expect that the first cell has a larger numerology than the second cell (e.g., resulting in a slot length of the first cell being smaller than the second cell).

Additionally, when the first cell is configured with subslotLength-ForPUCCH as subslot-based and the second cell is also configured as via subslotLength-ForPUCCH as subslot-based, the UE 804 may not expect the second cell to have a larger subslot length than the first cell. That is, in this case, a subslot length (e.g., measured in time) may not be longer than the subslot length of the first cell. In other cases, when the first cell is configured as slot-based and the second cell is configured via subslotLength-ForPUCCH as subslot-based, the UE 804 may not expect the second cell to have a larger subslot length than a slot length of the first cell. That is, in this cases, the subslot length of the second cell may not be longer than the slot length of the first cell. In other cases, if the first cell is configured as slot-based, the UE 804 may not expect the second cell to be configured as subslot-based.

In either case, if the signaling received in step 810 by the UE 804 configures the second cell to have a larger slot/subslot length than the first cell, this may be considered an error case and may be left up to UE-implementation to handle. For example, if the signaling received in step 810 by the UE 804 configures the second cell to have a larger slot/subslot length than the first cell, the UE 804 may disregard the signaling.

In the cases where the signaling received in step 810 by the UE 804 configures the first cell with subslot-based HARQ-ACK reporting and the UE 804 is configured for target PUCCH switching based on the time pattern for semi-static target PUCCH cell switching (e.g., semi-static carrier switching indication), the time pattern for the semi-static target PUCCH cell switching may be configured in different manners. For example, in some cases, the time pattern for semi-static target PUCCH cell switching may be configured in a unit of uplink slots associated with the first cell. Additionally, in this case, HARQ-ACK reporting on subslots in a slot may have a same target PUCCH cell. Additionally, in some cases, slots or subslots in the second cell that overlap with a slot of the first cell may also have a same PUCCH target cell.

In some cases, the time pattern for semi-static target PUCCH cell switching may be configured in units of uplink subslots associated with the first cell. Additionally, in other cases, the UE 804 may interpret the time pattern as slot-based or subslot-based for one HARQ-ACK codebook based at least in part on the configuration of another HARQ-ACK codebook. For example, in some cases, if the UE 804 is configured with a slot-based HARQ-ACK codebook and a subslot-based HARQ-ACK codebook, the UE 804 may interpret the time pattern for semi-static target PUCCH cell switching as slot-based for both HARQ-ACK codebooks. In other cases, the UE 804 may interpret the time pattern for semi-static target PUCCH cell switching as subslot-based when the UE 804 is configured with only one subslot-based HARQ-ACK codebook or two subslot-based HARQ-ACK codebooks.

Additionally, in the cases where the signaling received by the UE 804 in step 810 configures the first cell for subslot-based HARQ-ACK reporting and the UE 804 is configured for target PUCCH switching based on the time pattern for semi-static target PUCCH cell switching (e.g., semi-static carrier switching indication), the network entity 802 may configure the time pattern such that switching points in the time pattern between two PUCCH cells (e.g., between the first cell and the second cell) occur in conjunction with boundaries of the slot or subslot on the first cell or second cell. In other words, the switching points in the time pattern are aligned with the slot/sub-slot boundaries of the first and second cells. In the cases where the signaling received by the UE 804 in step 810 configures the first cell for subslot-based HARQ-ACK reporting and the UE 804 is configured for target PUCCH switching via an indication of a target PUCCH cell in DCI in a PDCCH (e.g., dynamic carrier switching indication), the switching points between two PUCCH cells (e.g., the first cell and the second cell) may not need to coincide with the slot/subslot boundary of both PUCCH cells.

Additionally, in the cases where the signaling received by the UE 804 in step 810 of FIG. 8 configures the first cell for subslot-based HARQ-ACK reporting and the UE 804 is configured for target PUCCH switching based on the time pattern for semi-static target PUCCH cell switching (e.g., semi-static carrier switching indication), the HARQ-ACK feedback timing value (e.g., PDSCH-to-HARQ-ACK slot offset (K1)) may be indicated in units of subslots associated with the first cell. In some cases, a reference point for applying the HARQ-ACK feedback timing value may be a subslot associated with the first cell in which an ending symbol of the PDSCH occurs. In cases where the PDCCH received by the UE 804 in step 820 does not schedule the PDSCH (e.g., a PDCCH indicating SPS PDSCH release, a PDCCH indicating SCell dormancy, etc.), a reference point for applying the HARQ-ACK feedback timing value may be a subslot associated with the first cell in which an ending symbol of the PDCCH occurs.

In cases where the UE 804 selects, based on the time pattern for semi-static target PUCCH cell switching, the second cell as the target PUCCH cell for transmitting a PUCCH with HARQ-ACK feedback and where a subslot length of the first cell is different form a slot/subslot length of the second cell, the UE 804 may transmit the PUCCH including the HARQ-ACK in step 840 in a slot or subslot on the second cell that overlaps with an uplink slot on the first cell as indicated by the HARQ-ACK feedback timing value (K1). In some cases, the slot or subslot on the second cell may be a first slot/subslot or last slot/subslot that overlaps with the uplink slot/subslot on the first cell. In other cases, the slot or subslot on the second cell may be a slot that is based on a fixed offset from the uplink slot on the first cell. In some cases, the network entity 802 may configure the UE 804 with the fixed offset based on DCI, RRC signaling, and/or media access control-control element (MAC-CE) signaling.

Figure 10:
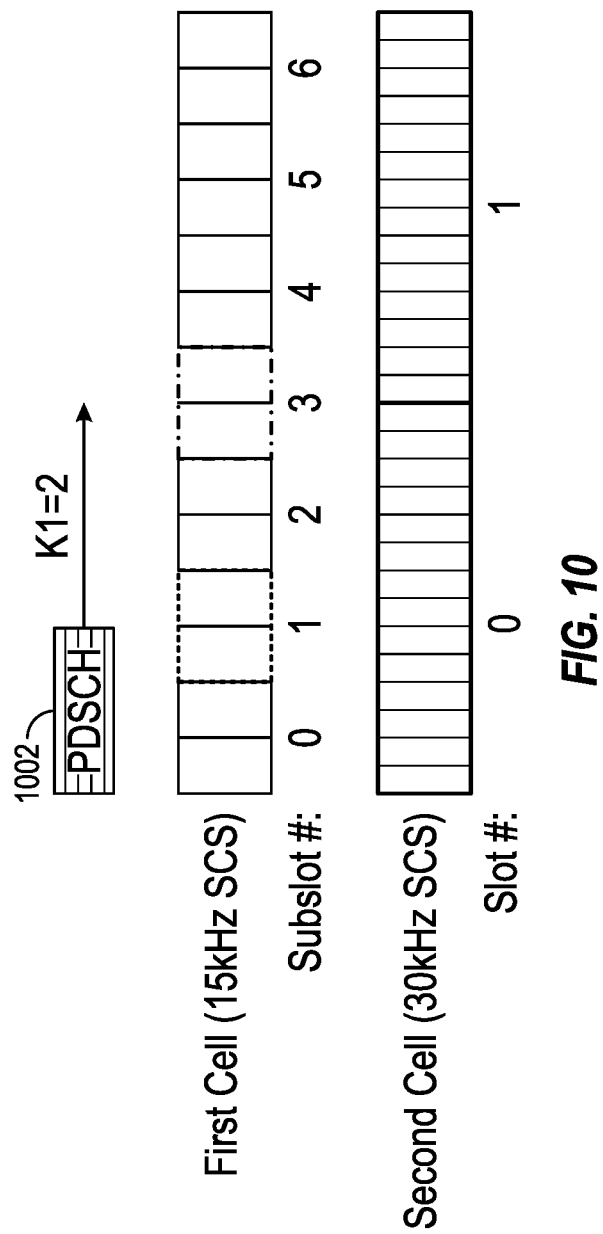
FIG. 10 illustrates an example for determining a slot/subslot on a second cell for transmitting PUCCH with the hybrid automatic repeat request acknowledgment feedback.

FIG. 10 illustrates an example for determining a slot/subslot on the second cell for transmitting the PUCCH with the HARQ-ACK feedback in accordance with the aspects described above. For example, as shown, the first cell is configured with a 15 kHz numerology and with a two-symbol subslot-based PUCCH HARQ-ACK feedback reporting while the second cell is configured with a 30 kHz numerology and with slot-based PUCCH HARQ-ACK feedback reporting. For example, as shown, the first cell may be configured with seven subslots (e.g., subslots 0-6), each subslot having two symbols while the second cell may be configured with two slots (e.g., slots 0 and 1), each slot having 14 symbols.

In this scenario, the UE 804 may determine a reference subslot on the first cell for the HARQ-ACK feedback timing value (K1) to be the subslot on the first cell in which an ending symbol of a PDSCH occurs in. In the example shown in FIG. 10, the UE 804 may determine the reference subslot to be subslot #1 since the PDSCH 1002 ends in the first symbol of subslot #1 associated with the first cell. Accordingly, assuming a HARQ-ACK feedback timing value of 2 (e.g., K1=2), the UE 804 may determine that the HARQ-ACK feedback for the PDSCH 1002 will be transmitted in subslot #3 in the PUCCH transmitted in step 840 of FIG. 8.

However, it may be the case that the time pattern for semi-static target PUCCH cell switching indicates that the target PUCCH cell for the HARQ-ACK feedback, determined to be transmitted in subslot #3 in FIG. 10, is the second cell (e.g., rather than the first cell). When this occurs, the UE 804 may need to determine a corresponding slot/subslot on the second cell in which to transmit the PUCCH with the HARQ-ACK feedback. For example, in some cases, the UE 804 may determine the slot/subslot on the second cell to be the first slot/subslot or last slot/subslot that overlaps with subslot #3 of the first cell. For example, in some cases, if the UE 804 is configured to select the first slot/subslot on the second cell, then the UE 804 may transmit, in step 840 in FIG. 8, the PUCCH with the HARQ-ACK feedback in the first slot of the second cell while if the UE 804 is configured to select the last slot/subslot on the second cell, then the UE 804 may transmit the PUCCH with the HARQ-ACK feedback in the second slot of the second cell. In other cases, the UE 804 may determine the slot/subslot on the second cell based on a slot offset, as described above.

Returning to FIG. 8, in some cases, the signaling received by the UE 804 in step configures the first cell for subslot-based HARQ-ACK reporting. Additionally, in some cases, the UE 804 may be configured for target PUCCH switching via an indication of a target PUCCH cell in DCI from the network entity 802 transmitted in a PDCCH (e.g., dynamic carrier switching indication). In this case, the UE 804 may be configured to first check or determine the target cell indicated by the DCI. The UE 804 may then transmit the PUCCH with the HARQ-ACK feedback in accordance with a HARQ-ACK feedback timing value (e.g., K1) based on a slot or subslot length for the first cell or second cell indicated in the DCI as the target PUCCH cell. In some cases, a reference point for applying the HARQ-ACK feedback timing value is a subslot or slot in the target PUCCH cell that overlaps with an end of the PDCCH received by the UE 804 in step 820 or a PDSCH scheduled by the PDCCH. In some cases, PUCCH resources for transmitting the HARQ-ACK feedback in step 840 may be contained within corresponding subslot boundaries.

Example Operations of a User Equipment

Figure 11:
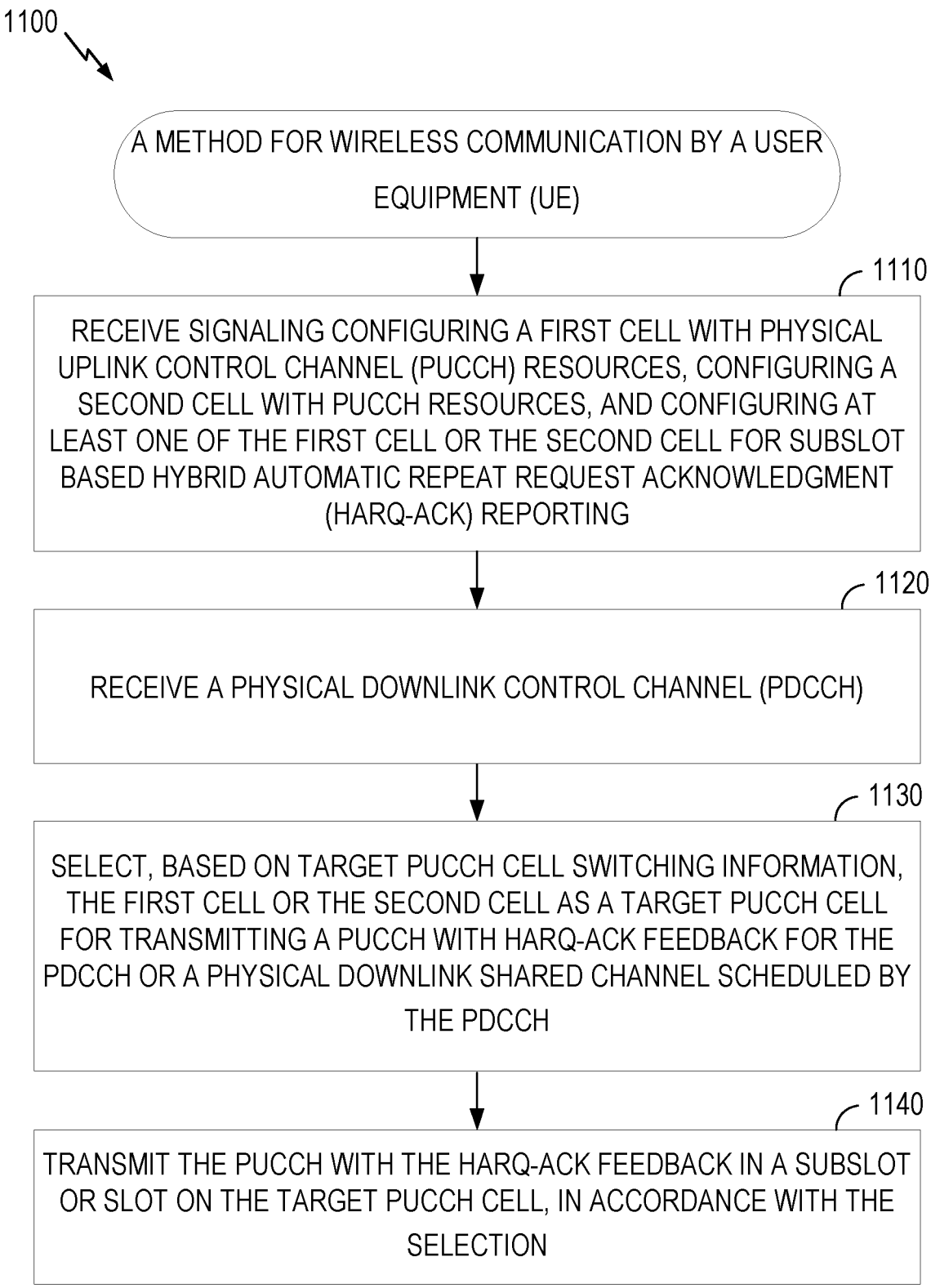
FIG. 11 depicts a method for wireless communications.

FIG. 11 shows a method 1100 for wireless communications by a UE, such as UE 104 of FIGS. 1 and 3, for transmitting HARQ-ACK feedback using PUCCH carrier switching for subslot-based cells.

As shown, method 1100 begin in step 1110 with the UE receiving signaling configuring a first cell with physical uplink control channel (PUCCH) resources, configuring a second cell with PUCCH resources, and configuring at least one of the first cell or the second cell for subslot-based hybrid automatic repeat request acknowledgment (HARQ-ACK) reporting.

In step 1120, the UE receives a physical downlink control channel (PDCCH).

In step 1130, the UE selects, based on target PUCCH cell switching information, the first cell or the second cell as a target PUCCH cell for transmitting a PUCCH with HARQ-ACK feedback for the PDCCH or a physical downlink shared channel (PDSCH) scheduled by the PDCCH.

In step 1140, the UE transmits the PUCCH with the HARQ-ACK feedback in a subslot or slot on the target PUCCH cell, in accordance with the selection.

In some cases, the first cell comprises a primary cell (PCell) or primary Secondary cell (PSCell). Additionally, in some cases, the second cell comprises a secondary cell (SCell).

In some cases, the target PUCCH cell switching information comprises: an indication of the target PUCCH cell via downlink control information (DCI); or a semi-static time pattern for target PUCCH cell switching.

In some cases, the signaling configures both the first cell and the second cell for subslot-based HARQ-ACK reporting. Additionally, in some cases, the first cell and second cell have different subslot length configurations for a given HARQ-ACK codebook.

In some cases, the signaling configures one of the first cell or the second cell for subslot-based HARQ-ACK reporting and the other of the first cell or the second cell for slot-based HARQ-ACK reporting.

In some cases, the signaling configures the first cell for subslot-based HARQ-ACK reporting. Additionally, in some cases, the PUCCH with the HARQ-ACK feedback is transmitted in accordance with a HARQ-ACK feedback timing value based on a subslot length configured for the first cell.

In some cases, selection of the target PUCCH cell is based on a time pattern for semi-static PUCCH cell switching.

In some cases, a same numerology is used for the first cell and the second cell. Additionally, in some cases, the UE assumes a same subslot length, configured for the first cell, applies to the second cell.

In some cases, a slot duration of the first cell is longer than a slot duration of the second cell. Additionally, in some cases, a slot or subslot duration of the second cell is determined to be the same as a subslot length of the first cell.

In some cases, the UE does not expect the second cell to have a larger slot length than the first cell. Additionally, in some cases, if the signaling configures the second cell to have a larger slot length than the first cell, the UE disregards the signaling.

In some cases, the signaling configures the first cell for subslot-based HARQ-ACK reporting. Additionally, in some cases, the UE is configured for target PUCCH switching based on a time pattern for semi-static target PUCCH cell switching.

In some cases, the time pattern for semi-static target PUCCH cell switching is configured in a unit of uplink slots of the first cell. Additionally, in some cases, HARQ-ACK reporting on subslots in a slot have a same target PUCCH cell. Additionally, in some cases, slots or subslots in the second cell that overlap with a slot of the first cell will have a same PUCCH target cell.

In some cases, the time pattern for semi-static target PUCCH cell switching is configured in units of an uplink subslot of the first cell.

In some cases, the UE interprets the time pattern for semi-static target PUCCH cell switching as slot-based if the UE is configured with a HARQ-ACK codebook that is slot-based, otherwise the UE interprets the time pattern for semi-static target PUCCH cell switching as subslot-based.

In some cases, a HARQ-ACK feedback timing value is indicated in units of subslots of the first cell.

In some cases, a reference point for applying the HARQ-ACK feedback timing value is a subslot on the first cell in which an ending symbol of the PDSCH or PDCCH occurs.

In some cases, switching points in the time pattern between two PUCCH cells occur in conjunction with boundaries of the slot or subslot on the first cell or second cell.

In some cases, if the second cell is selected for transmitting the PUCCH with the HARQ-ACK feedback and a subslot length on the first cell is different than a slot or subslot length on the second cell, the UE transmits the PUCCH with the HARQ-ACK feedback in a first slot or subslot on the second cell that overlaps with an uplink slot on the first cell as indicated by a HARQ-ACK feedback timing value.

In some cases, the target PUCCH cell switching information comprises an indication of a target PUCCH cell via downlink control information (DCI) in the PDCCH. Additionally, in some cases, the signaling configures the first cell for subslot-based HARQ-ACK reporting. Additionally, in some cases, the PUCCH with the HARQ-ACK feedback is transmitted in accordance with a HARQ-ACK feedback timing value based on a slot or subslot length for the first cell or second cell indicated in the DCI as the target PUCCH cell.

In some cases, a reference point for applying the HARQ-ACK feedback timing value is a subslot or slot in the target PUCCH cell that overlaps with an end of the PDCCH or PDSCH.

Figure 13:
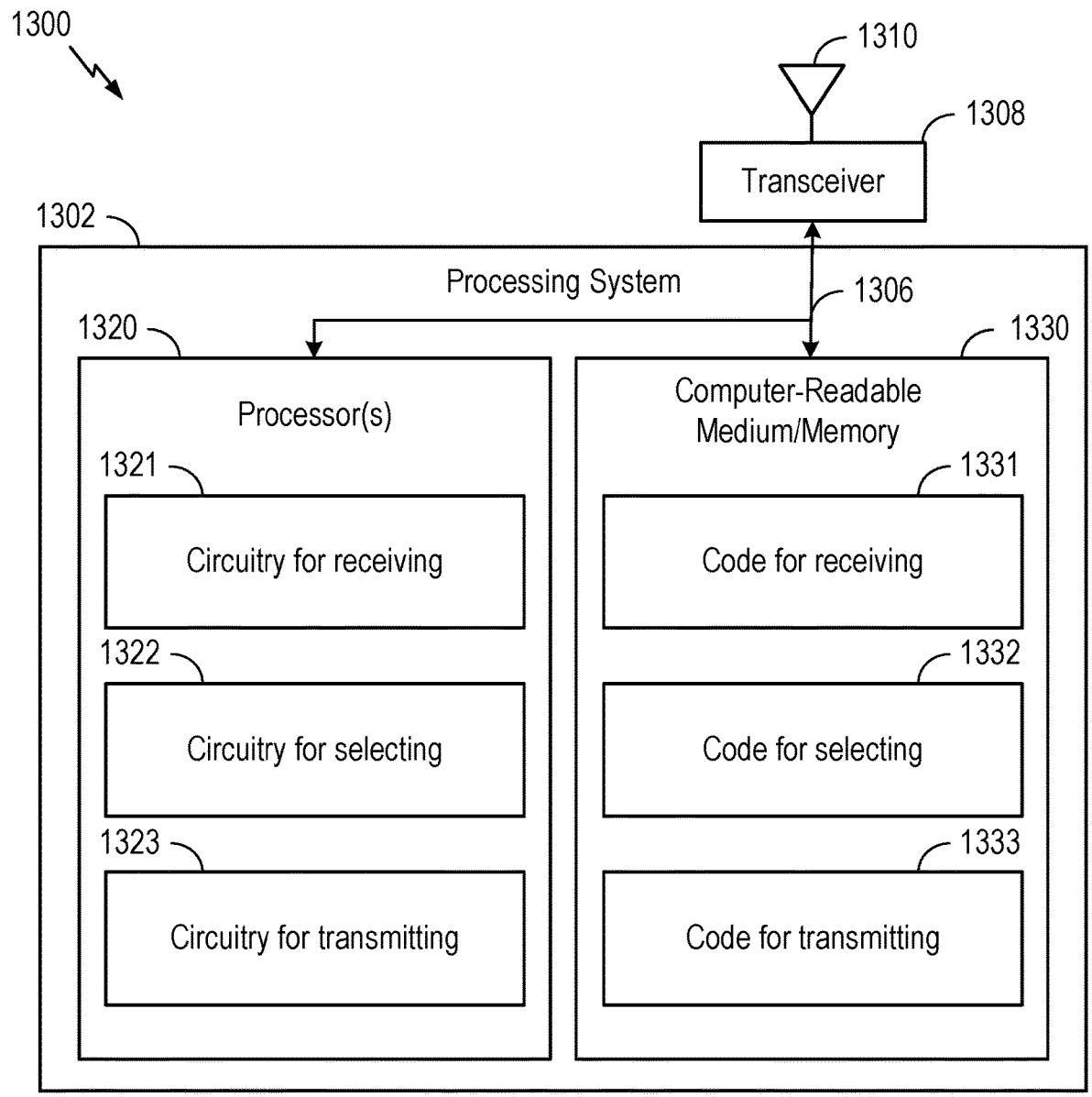
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100.

Communications device 1300 is described below in further detail.

Note that FIG. 11 is just one example of a method, and other methods including fewer, additional, or alternative steps are possible consistent with this disclosure.

Example Operations of a Network Entity

Figure 12:
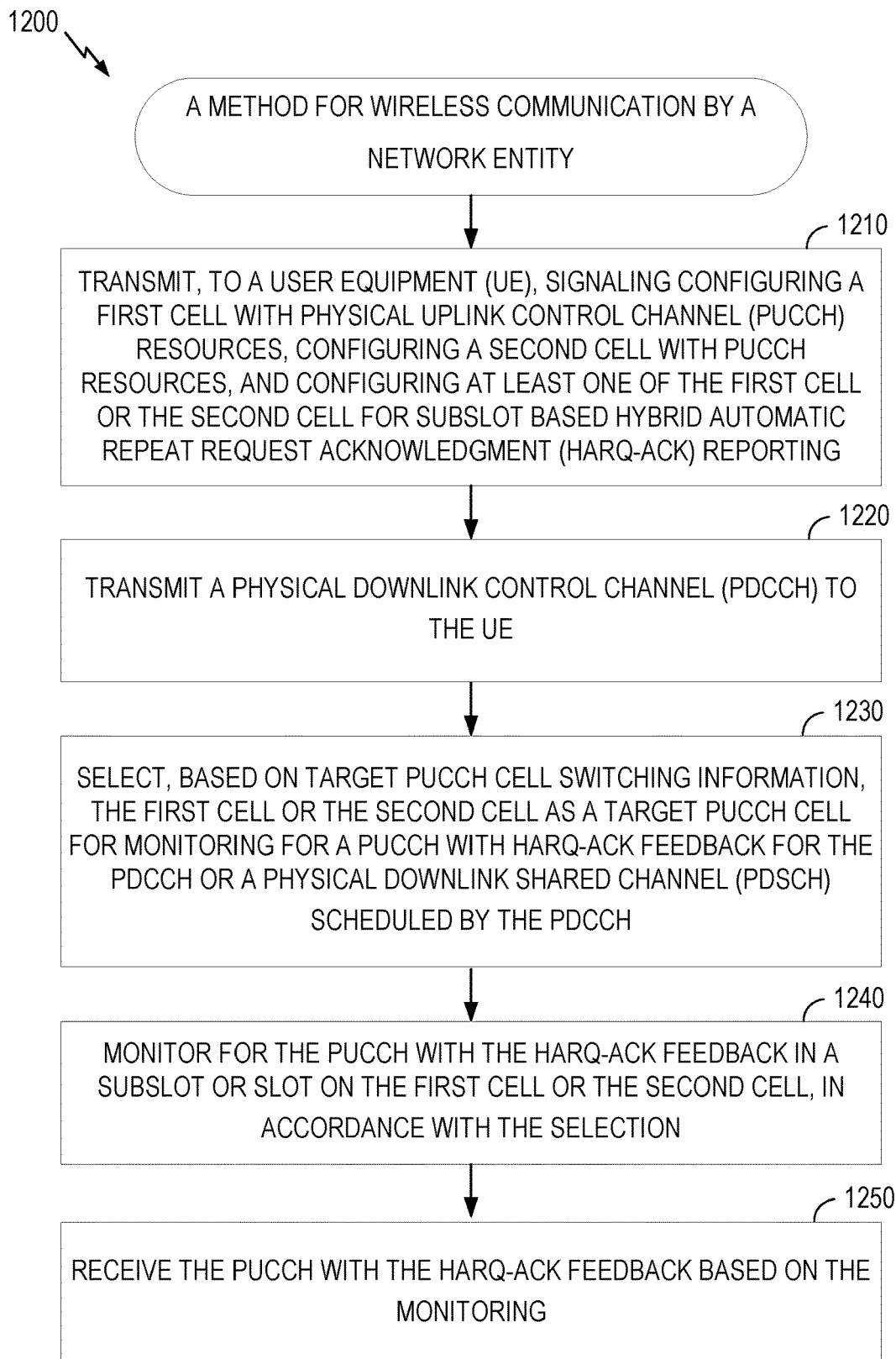
FIG. 12 depicts a method for wireless communications.

FIG. 12 shows a method 1200 for wireless communications by a network entity, such as BS 102 of FIGS. 1 and 3 or a disaggregated base station as discussed with respect to FIG. 2, for receiving HARQ-ACK feedback based on PUCCH carrier switching for subslot-based cells.

As shown, method 1200 begin in step 1210 with the network entity transmitting, to a user equipment (UE), signaling configuring a first cell with physical uplink control channel (PUCCH) resources, configuring a second cell with PUCCH resources, and configuring at least one of the first cell or the second cell for subslot-based hybrid automatic repeat request acknowledgment (HARQ-ACK) reporting.

In step 1220, the network entity transmits a physical downlink control channel (PDCCH) to the UE.

In step 1230, the network entity selects, based on target PUCCH cell switching information, the first cell or the second cell as a target PUCCH cell for monitoring for a PUCCH with HARQ-ACK feedback for the PDCCH or a physical downlink shared channel (PDSCH) scheduled by the PDCCH.

In step 1240, the network entity monitors for the PUCCH with the HARQ-ACK feedback in a subslot or slot on the first cell or the second cell, in accordance with the selection.

In step 1250, the network entity receives the PUCCH with the HARQ-ACK feedback based on the monitoring.

In some cases, the first cell comprises a primary cell (PCell) or primary Secondary cell (PSCell). Additionally, in some cases, the second cell comprises a secondary cell (SCell).

In some cases, the target PUCCH cell switching information comprises: an indication of the target PUCCH cell via downlink control information (DCI); or a semi-static time pattern for target PUCCH cell switching.

In some cases, the signaling configures both the first cell and the second cell for subslot-based HARQ-ACK reporting. Additionally, in some cases, the first cell and second cell have different subslot length configurations for a given HARQ-ACK codebook.

In some cases, the signaling configures one of the first cell or the second cell for subslot-based HARQ-ACK reporting and the other of the first cell or the second cell for slot-based HARQ-ACK reporting.

In some cases, the signaling configures the first cell for subslot-based HARQ-ACK reporting. Additionally, in some cases, the PUCCH with the HARQ-ACK feedback is transmitted in accordance with a HARQ-ACK feedback timing value based on a subslot length configured for the first cell.

In some cases, selection of the target PUCCH cell is based on a time pattern for semi-static PUCCH cell switching.

In some cases, a same numerology is used for the first cell and the second cell. Additionally, in some cases, the network entity assumes a same subslot length, configured for the first cell, applies to the second cell.

In some cases, a slot duration of the first cell is longer than a slot duration of the second cell. Additionally, in some cases, a slot or subslot duration of the second cell is determined to be the same as the subslot length of the first cell.

In some cases, the network entity ensures that the second cell does not have a larger slot length than the first cell.

In some cases, the signaling configures the first cell for subslot-based HARQ-ACK reporting. Additionally, in some cases, the network entity configures the UE for target PUCCH switching based on a time pattern for semi-static target PUCCH cell switching.

In some cases, the time pattern for semi-static target PUCCH cell switching is configured in the unit of uplink slots of the first cell. Additionally, in some cases, HARQ-ACK reporting on subslots in a slot have a same target PUCCH cell. Additionally, in some cases, slots or subslots in the second cell that overlap with a slot of the first cell will have a same PUCCH target cell.

In some cases, the time pattern for semi-static target PUCCH cell switching is configured in units of an uplink subslot of the first cell.

In some cases, the network entity interprets the time pattern for semi-static target PUCCH cell switching as slot-based if the UE is configured with a HARQ-ACK codebook that is slot-based, otherwise the UE interprets the time pattern for semi-static target PUCCH cell switching as subslot-based.

In some cases, a HARQ-ACK feedback timing value is indicates in units of subslots of the first cell.

In some cases, a reference point for applying the HARQ-ACK feedback timing value is a subslot on the first cell in which an ending symbol of the PDSCH or PDCCH occurs.

In some cases, switching points in the time pattern between two PUCCH cells occur in conjunction with boundaries of the slot or subslot on the first cell or second cell.

In some cases, if the second cell is selected for transmitting the PUCCH with the HARQ-ACK feedback and a subslot length on the first cell is different than a slot or subslot length on the second cell, the network entity monitors for the PUCCH with the HARQ-ACK feedback in a first slot or subslot on the second cell that overlaps with an uplink slot on the first cell as indicated by a HARQ-ACK feedback timing value.

In some cases, the target PUCCH cell switching information comprises an indication of a target PUCCH cell via downlink control information (DCI) in the PDCCH. Additionally, in some cases, the signaling configures the first cell for subslot-based HARQ-ACK reporting. Additionally, in some cases, the PUCCH with the HARQ-ACK feedback is transmitted in accordance with a HARQ-ACK feedback timing value based on a slot or subslot length for the first cell or second cell indicated in the DCI as the target PUCCH cell.

In some cases, a reference point for applying the HARQ-ACK feedback timing value is a subslot or slot in the target PUCCH cell that overlaps with an end of the PDCCH or PDSCH.

Figure 14:
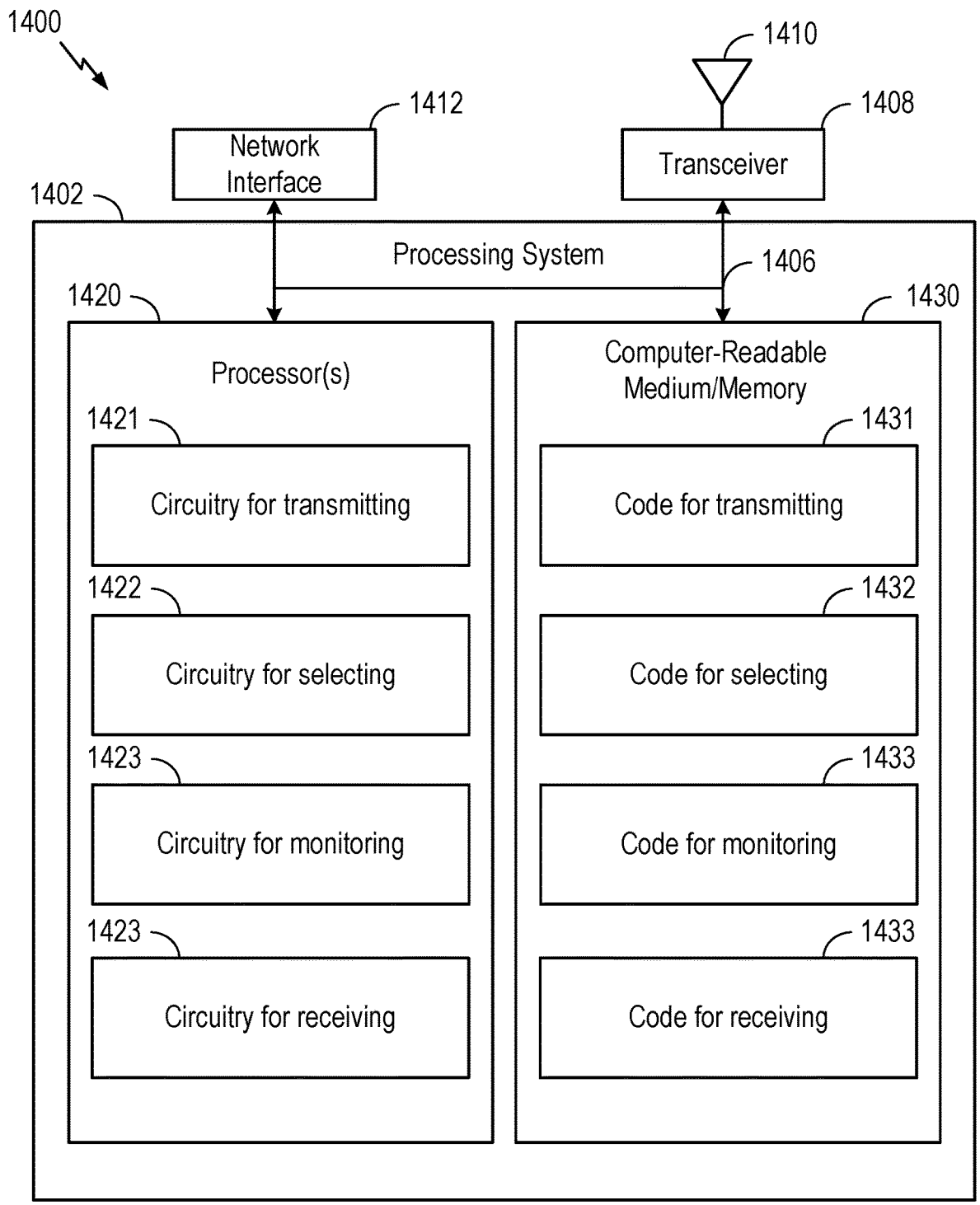
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Wireless Communication Devices

FIG. 13 depicts aspects of an example communications device 1300. In some aspects, communications device 1300 is a user equipment, such as UE 104 described above with respect to FIGS. 1 and 3.

The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes one or more processors 1320. In various aspects, the one or more processors 1320 may be representative of one or more of receive processor 358, transmit processor 364, TX MIMO processor 366, and/or controller/processor 380, as described with respect to FIG. 3. The one or more processors 1320 are coupled to a computer-readable medium/memory 1330 via a bus 1306. In certain aspects, the computer-readable medium/memory 1330 is configured to store instructions (e.g., computer-executable code) that when executed by the one or more processors 1320, cause the one or more processors 1320 to perform the method 1100 described with respect to FIG. 11, or any aspect related to it. Note that reference to a processor performing a function of communications device 1300 may include one or more processors performing that function of communications device 1300.

In the depicted example, computer-readable medium/memory 1330 stores code (e.g., executable instructions) for receiving 1331, code for selecting 1332, and code for transmitting 1333. Processing of the code 1331-1333 may cause the communications device 1300 to perform the method 1100 described with respect to FIG. 11, or any aspect related to it.

The one or more processors 1320 include circuitry configured to implement (e.g., execute) the code stored in the computer-readable medium/memory 1330, including circuitry for receiving 1321, circuitry for selecting 1322, and circuitry for transmitting 1323. Processing with circuitry 1321-1323 may cause the communications device 1300 to perform the method 1100 described with respect to FIG. 11, or any aspect related to it.

Various components of the communications device 1300 may provide means for performing the method 1100 described with respect to FIG. 11, or any aspect related to it. For example, means for transmitting, sending or outputting for transmission may include the transceivers 354 and/or antenna(s) 352 of the UE 104 illustrated in FIG. 3 and/or transceiver 1308 and antenna 1310 of the communications device 1300 in FIG. 13. Means for receiving or obtaining may include the transceivers 354 and/or antenna(s) 352 of the UE 104 illustrated in FIG. 3 and/or transceiver 1308 and antenna 1310 of the communications device 1300 in FIG. 13.

FIG. 14 depicts aspects of an example communications device. In some aspects, communications device 1400 is a network entity, such as BS 102 of FIGS. 1 and 3, or a disaggregated base station as discussed with respect to FIG. 2.

The communications device 1400 includes a processing system 1402 coupled to a transceiver 1408 (e.g., a transmitter and/or a receiver) and/or a network interface 1412. The transceiver 1408 is configured to transmit and receive signals for the communications device 1400 via an antenna 1410, such as the various signals as described herein. The network interface 1412 is configured to obtain and send signals for the communications device 1400 via communications link(s), such as a backhaul link, midhaul link, and/or fronthaul link as described herein, such as with respect to FIG. 2. The processing system 1402 may be configured to perform processing functions for the communications device 1400, including processing signals received and/or to be transmitted by the communications device 1400.

The processing system 1402 includes one or more processors 1420. In various aspects, one or more processors 1420 may be representative of one or more of receive processor 338, transmit processor 320, TX MIMO processor 330, and/or controller/processor 340, as described with respect to FIG. 3. The one or more processors 1420 are coupled to a computer-readable medium/memory 1430 via a bus 1406. In certain aspects, the computer-readable medium/memory 1430 is configured to store instructions (e.g., computer-executable code) that when executed by the one or more processors 1420, cause the one or more processors 1420 to perform the method 1200 described with respect to FIG. 12, or any aspect related to it. Note that reference to a processor of communications device 1400 performing a function may include one or more processors of communications device 1400 performing that function.

In the depicted example, the computer-readable medium/memory 1430 stores code (e.g., executable instructions) for transmitting 1431, code for selecting 1432, code for monitoring 1433, and code for receiving 1434. Processing of the code 1431-1434 may cause the communications device 1400 to perform the method 1200 described with respect to FIG. 12, or any aspect related to it.

The one or more processors 1420 include circuitry configured to implement (e.g., execute) the code stored in the computer-readable medium/memory 1430, including circuitry for transmitting 1421, circuitry for selecting 1422, circuitry for monitoring 1423, and circuitry for receiving 1424. Processing with circuitry 1421-1424 may cause the communications device 1400 to perform the method 1200 as described with respect to FIG. 12, or any aspect related to it.

Various components of the communications device 1400 may provide means for performing the method 1200 as described with respect to FIG. 12, or any aspect related to it. Means for transmitting, sending or outputting for transmission may include the transceivers 332 and/or antenna(s) 334 of the BS 102 illustrated in FIG. 3 and/or transceiver 1408 and antenna 1410 of the communications device 1400 in FIG. 14. Means for receiving or obtaining may include the transceivers 332 and/or antenna(s) 334 of the BS 102 illustrated in FIG. 3 and/or transceiver 1408 and antenna 1410 of the communications device 1400 in FIG. 14.

Example Clauses

Implementation examples are described in the following numbered clauses:

Clause 1: A method for wireless communication by a user equipment (UE), comprising: receiving signaling configuring a first cell with physical uplink control channel (PUCCH) resources, configuring a second cell with PUCCH resources, and configuring at least one of the first cell or the second cell for subslot-based hybrid automatic repeat request acknowledgment (HARQ-ACK) reporting; receiving a physical downlink control channel (PDCCH); selecting, based on target PUCCH cell switching information, the first cell or the second cell as a target PUCCH cell for transmitting a PUCCH with HARQ-ACK feedback for the PDCCH or a physical downlink shared channel (PDSCH) scheduled by the PDCCH; and transmitting the PUCCH with the HARQ-ACK feedback in a subslot or slot on the target PUCCH cell, in accordance with the selection.

Clause 2: The method of Clause 1, wherein: the first cell comprises a primary cell (PCell) or primary Secondary cell (PSCell); and the second cell comprises a secondary cell (SCell).

Clause 3: The method of any one of Clauses 1-2, wherein the target PUCCH cell switching information comprises: an indication of the target PUCCH cell via downlink control information (DCI); or a semi-static time pattern for target PUCCH cell switching.

Clause 4: The method of any one of Clauses 1-3, wherein: the signaling configures both the first cell and the second cell for subslot-based HARQ-ACK reporting; and the first cell and second cell have different subslot length configurations for a given HARQ-ACK codebook.

Clause 5: The method of any one of Clauses 1-3, wherein the signaling configures one of the first cell or the second cell for subslot-based HARQ-ACK reporting and the other of the first cell or the second cell for slot-based HARQ-ACK reporting.

Clause 6: The method of any one of Clauses 1-3, wherein: the signaling configures the first cell for subslot-based HARQ-ACK reporting; and the PUCCH with the HARQ-ACK feedback is transmitted in accordance with a HARQ-ACK feedback timing value based on a subslot length configured for the first cell.

Clause 7: The method of Clause 6, wherein selection of the target PUCCH cell is based on a time pattern for semi-static PUCCH cell switching.

Clause 8: The method of any one of Clauses 6-7, wherein: a same numerology is used for the first cell and the second cell; and the UE assumes a same subslot length, configured for the first cell, applies to the second cell.

Clause 9: The method of any one of Clauses 6-7, wherein: a slot duration of the first cell is longer than a slot duration of the second cell; and a slot or subslot duration of the second cell is determined to be the same as a subslot length of the first cell.

Clause 10: The method of any one of Clauses 6-7, wherein: the UE does not expect the second cell to have a larger slot length than the first cell; and if the signaling configures the second cell to have a larger slot length than the first cell, the UE disregards the signaling.

Clause 11: The method of any one of Clauses 1-10, wherein: the signaling configures the first cell for subslot-based HARQ-ACK reporting; and the UE is configured for target PUCCH switching based on a time pattern for semi-static target PUCCH cell switching.

Clause 12: The method of Clause 11, wherein: the time pattern for semi-static target PUCCH cell switching is configured in a unit of uplink slots of the first cell; HARQ-ACK reporting on subslots in a slot have a same target PUCCH cell; and slots or subslots in the second cell that overlap with a slot of the first cell will have a same PUCCH target cell.

Clause 13: The method of Clause 11, wherein the time pattern for semi-static target PUCCH cell switching is configured in units of an uplink subslot of the first cell.

Clause 14: The method of Clause 11, wherein: the UE interprets the time pattern for semi-static target PUCCH cell switching as slot-based if the UE is configured with a HARQ-ACK codebook that is slot-based, otherwise the UE interprets the time pattern for semi-static target PUCCH cell switching as subslot-based.

Clause 15: The method of Clause 11, wherein a HARQ-ACK feedback timing value is indicated in units of subslots of the first cell.

Clause 16: The method of Clause 15, wherein a reference point for applying the HARQ-ACK feedback timing value is a subslot on the first cell in which an ending symbol of the PDSCH or PDCCH occurs.

Clause 17: The method of any one of Clauses 11-16, wherein switching points in the time pattern between two PUCCH cells occur in conjunction with boundaries of the slot or subslot on the first cell or second cell.

Clause 18: The method of Clause 17, wherein, if the second cell is selected for transmitting the PUCCH with the HARQ-ACK feedback and a subslot length on the first cell is different than a slot or subslot length on the second cell, the UE transmits the PUCCH with the HARQ-ACK feedback in a first slot or subslot on the second cell that overlaps with an uplink slot on the first cell as indicated by a HARQ-ACK feedback timing value.

Clause 19: The method of any one of Clauses 1-2, wherein: the target PUCCH cell switching information comprises an indication of a target PUCCH cell via downlink control information (DCI) in the PDCCH; the signaling configures the first cell for subslot-based HARQ-ACK reporting; and the PUCCH with the HARQ-ACK feedback is transmitted in accordance with a HARQ-ACK feedback timing value based on a slot or subslot length for the first cell or second cell indicated in the DCI as the target PUCCH cell.

Clause 20: The method of Clause 19, wherein a reference point for applying the HARQ-ACK feedback timing value is a subslot or slot in the target PUCCH cell that overlaps with an end of the PDCCH or PDSCH.

Clause 21: A method for wireless communication by a network entity, comprising: transmitting, to a user equipment (UE), signaling configuring a first cell with physical uplink control channel (PUCCH) resources, configuring a second cell with PUCCH resources, and configuring at least one of the first cell or the second cell for subslot-based hybrid automatic repeat request acknowledgment (HARQ-ACK) reporting; transmitting a physical downlink control channel (PDCCH) to the UE; selecting, based on target PUCCH cell switching information, the first cell or the second cell as a target PUCCH cell for monitoring for a PUCCH with HARQ-ACK feedback for the PDCCH or a physical downlink shared channel (PDSCH) scheduled by the PDCCH; and monitoring for the PUCCH with the HARQ-ACK feedback in a subslot or slot on the first cell or the second cell, in accordance with the selection.

Clause 22: The method of Clause 21, wherein: the first cell comprises a primary cell (PCell) or primary Secondary cell (PSCell); and the second cell comprises a secondary cell (SCell).

Clause 23: The method of any one of Clauses 21-22, wherein the target PUCCH cell switching information comprises: an indication of the target PUCCH cell via downlink control information (DCI); or a semi-static time pattern for target PUCCH cell switching.

Clause 24: The method of any one of Clauses 21-23, wherein: the signaling configures both the first cell and the second cell for subslot-based HARQ-ACK reporting; and the first cell and second cell have different subslot length configurations for a given HARQ-ACK codebook.

Clause 25: The method of any one of Clauses 21-23, wherein the signaling configures one of the first cell or the second cell for subslot-based HARQ-ACK reporting and the other of the first cell or the second cell for slot-based HARQ-ACK reporting.

Clause 26: The method of any one of Clauses 21-23, wherein: the signaling configures the first cell for subslot-based HARQ-ACK reporting; and the PUCCH with the HARQ-ACK feedback is transmitted in accordance with a HARQ-ACK feedback timing value based on a subslot length configured for the first cell.

Clause 27: The method of Clause 26, wherein selection of the target PUCCH cell is based on a time pattern for semi-static PUCCH cell switching.

Clause 28: The method of any one of Clauses 26-27, wherein: a same numerology is used for the first cell and the second cell; and the network entity assumes a same subslot length, configured for the first cell, applies to the second cell.

Clause 29: The method of any one of Clauses 26-27, wherein: a slot duration of the first cell is longer than a slot duration of the second cell; and a slot or subslot duration of the second cell is determined to be the same as the subslot length of the first cell.

Clause 30: The method of any one of Clauses 26-27, wherein: the network entity ensures that the second cell does not have a larger slot length than the first cell.

Clause 31: The method of any one of Clauses 21-30, wherein: the signaling configures the first cell for subslot-based HARQ-ACK reporting; and the network entity configures the UE for target PUCCH switching based on a time pattern for semi-static target PUCCH cell switching.

Clause 32: The method of Clause 31, wherein: the time pattern for semi-static target PUCCH cell switching is configured in the unit of uplink slots of the first cell; HARQ-ACK reporting on subslots in a slot have a same target PUCCH cell; and slots or subslots in the second cell that overlap with a slot of the first cell will have a same PUCCH target cell.

Clause 33: The method of Clause 31, wherein the time pattern for semi-static target PUCCH cell switching is configured in units of an uplink subslot of the first cell.

Clause 34: The method of Clause 31, wherein: the network entity interprets the time pattern for semi-static target PUCCH cell switching as slot-based if the UE is configured with a HARQ-ACK codebook that is slot-based, otherwise the UE interprets the time pattern for semi-static target PUCCH cell switching as subslot-based.

Clause 35: The method of Clause 31, wherein a HARQ-ACK feedback timing value is indicates in units of subslots of the first cell.

Clause 36: The method of Clause 35, wherein a reference point for applying the HARQ-ACK feedback timing value is a subslot on the first cell in which an ending symbol of the PDSCH or PDCCH occurs.

Clause 37: The method of any one of Clauses 31-36, wherein switching points in the time pattern between two PUCCH cells occur in conjunction with boundaries of the slot or subslot on the first cell or second cell.

Clause 38: The method of any one of Clauses 35-37, wherein, if the second cell is selected for transmitting the PUCCH with the HARQ-ACK feedback and a subslot length on the first cell is different than a slot or subslot length on the second cell, the network entity monitors for the PUCCH with the HARQ-ACK feedback in a first slot or subslot on the second cell that overlaps with an uplink slot on the first cell as indicated by a HARQ-ACK feedback timing value.

Clause 39: The method of any one of Clauses 21-22, wherein: the target PUCCH cell switching information comprises an indication of a target PUCCH cell via downlink control information (DCI) in the PDCCH; the signaling configures the first cell for subslot-based HARQ-ACK reporting; and the PUCCH with the HARQ-ACK feedback is transmitted in accordance with a HARQ-ACK feedback timing value based on a slot or subslot length for the first cell or second cell indicated in the DCI as the target PUCCH cell.

Clause 40: The method of Clause 39, wherein a reference point for applying the HARQ-ACK feedback timing value is a subslot or slot in the target PUCCH cell that overlaps with an end of the PDCCH or PDSCH.

Clause 41: An apparatus, comprising: a memory comprising executable instructions; and one or more processors configured to execute the executable instructions and cause the apparatus to perform a method in accordance with any one of Clauses 1-40.

Clause 42: An apparatus, comprising means for performing a method in accordance with any one of Clauses 1-40.

Clause 43: A non-transitory computer-readable medium comprising executable instructions that, when executed by one or more processors of an apparatus, cause the apparatus to perform a method in accordance with any one of Clauses 1-40.

Clause 44: A computer program product embodied on a computer-readable storage medium comprising code for performing a method in accordance with any one of Clauses 1-40.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
   receiving signaling configuring a first cell with physical uplink control channel (PUCCH) resources, configuring a second cell with PUCCH resources, and configuring at least one of the first cell or the second cell for subslot-based hybrid automatic repeat request acknowledgment (HARQ-ACK) reporting;
   receiving a physical downlink control channel (PDCCH);
   selecting, based on target PUCCH cell switching information, the first cell or the second cell as a target PUCCH cell for transmitting a PUCCH with HARQ-ACK feedback for the PDCCH or a physical downlink shared channel (PDSCH) scheduled by the PDCCH; and
   transmitting the PUCCH with the HARQ-ACK feedback in a subslot or slot on the target PUCCH cell, in accordance with the selection.

2. The method of claim 1, wherein:
   the first cell comprises a primary cell (PCell) or primary Secondary cell (PSCell); and
   the second cell comprises a secondary cell (SCell).

3. The method of claim 1, wherein the target PUCCH cell switching information comprises:
   an indication of the target PUCCH cell received via downlink control information (DCI); or
   a semi-static time pattern for target PUCCH cell switching.

4. The method of claim 1, wherein:
   the signaling configures both the first cell and the second cell for subslot-based HARQ-ACK reporting; and
   the first cell and second cell have different subslot length configurations for a given HARQ-ACK codebook.

5. The method of claim 1, wherein the signaling configures one of the first cell or the second cell for subslot-based HARQ-ACK reporting and the other of the first cell or the second cell for slot-based HARQ-ACK reporting.

6. The method of claim 1, wherein:
   the signaling configures the first cell for subslot-based HARQ-ACK reporting; and
   the PUCCH with the HARQ-ACK feedback is transmitted in accordance with a HARQ-ACK feedback timing value based on a subslot length configured for the first cell.

7. The method of claim 6, wherein selection of the target PUCCH cell is based on a time pattern for semi-static PUCCH cell switching.

8. The method of claim 7, wherein:
   the UE does not expect the second cell to have a larger slot length than the first cell; and
   if the signaling configures the second cell to have a larger slot length than the first cell, the UE disregards the signaling.

9. The method of claim 1, wherein:
   the signaling configures the first cell for subslot-based HARQ-ACK reporting; and
   the UE is configured for target PUCCH switching based on a time pattern for semi-static target PUCCH cell switching.

10. The method of claim 9, wherein:
    the time pattern for semi-static target PUCCH cell switching is configured in a unit of uplink slots of the first cell; and
    HARQ-ACK reporting on subslots in a slot have a same target PUCCH cell.

11. The method of claim 9, wherein the time pattern for semi-static target PUCCH cell switching is configured in units of an uplink subslot of the first cell.

12. The method of claim 9, wherein:
    a HARQ-ACK feedback timing value is indicated in units of subslots of the first cell; and
    a reference point for applying the HARQ-ACK feedback timing value is a subslot on the first cell in which an ending symbol of the PDSCH or PDCCH occurs.

13. The method of claim 9, wherein switching points in the time pattern between two PUCCH cells occur in conjunction with boundaries of the slot or subslot on the first cell or second cell.

14. The method of claim 9, wherein, if the second cell is selected for transmitting the PUCCH with the HARQ-ACK feedback and a subslot length on the first cell is different than a slot or subslot length on the second cell, the UE transmits the PUCCH with the HARQ-ACK feedback in a first slot or subslot on the second cell that overlaps with an uplink slot on the first cell as indicated by a HARQ-ACK feedback timing value.

15. The method of claim 1, wherein:
    the target PUCCH cell switching information comprises an indication of a target PUCCH cell received via downlink control information (DCI) in the PDCCH; and
    the PUCCH with the HARQ-ACK feedback is transmitted in accordance with a HARQ-ACK feedback timing value based on a slot or subslot length for the first cell or second cell indicated in the DCI as the target PUCCH cell.

16. The method of claim 15, wherein a reference point for applying the HARQ-ACK feedback timing value is a subslot or slot in the target PUCCH cell that overlaps with an end of the PDCCH or PDSCH.

17. The method of claim 15, wherein the signaling configures the first cell for subslot-based HARQ-ACK reporting.

18. A method for wireless communication by a network entity, comprising:
    transmitting, to a user equipment (UE), signaling configuring a first cell with physical uplink control channel (PUCCH) resources, configuring a second cell with PUCCH resources, and configuring at least one of the first cell or the second cell for subslot-based hybrid automatic repeat request acknowledgment (HARQ-ACK) reporting;

transmitting a physical downlink control channel (PDCCH) to the UE;

selecting, based on target PUCCH cell switching information, the first cell or the second cell as a target PUCCH cell for monitoring for a PUCCH with HARQ-ACK feedback for the PDCCH or a physical downlink shared channel (PDSCH) scheduled by the PDCCH; and monitoring for the PUCCH with the HARQ-ACK feedback in a subslot or slot on the first cell or the second cell, in accordance with the selection.

19. The method of claim 18, wherein:
the first cell comprises a primary cell (PCell) or primary Secondary cell (PSCell); and
the second cell comprises a secondary cell (SCell).

20. The method of claim 18, wherein the target PUCCH cell switching information comprises:
an indication of the target PUCCH cell transmitted via downlink control information (DCI); or
a semi-static time pattern for target PUCCH cell switching.

21. The method of claim 18, wherein:
the signaling configures both the first cell and the second cell for subslot-based HARQ-ACK reporting; and
the first cell and second cell have different subslot length configurations for a given HARQ-ACK codebook.

22. The method of claim 18, wherein the signaling configures one of the first cell or the second cell for subslot-based HARQ-ACK reporting and the other of the first cell or the second cell for slot-based HARQ-ACK reporting.

23. The method of claim 18, wherein:
the signaling configures the first cell for subslot-based HARQ-ACK reporting;
and the PUCCH with the HARQ-ACK feedback is transmitted in accordance with a HARQ-ACK feedback timing value based on a subslot length configured for the first cell.

24. The method of claim 23, wherein selection of the target PUCCH cell is based on a time pattern for semi-static PUCCH cell switching.

25. The method of claim 24, wherein:
the network entity ensures that the second cell does not have a larger slot length than the first cell.

26. The method of claim 18, wherein:
the signaling configures the first cell for subslot-based HARQ-ACK reporting;
and the network entity configures the UE for target PUCCH switching based on a time pattern for semi-static target PUCCH cell switching.

27. The method of claim 26, wherein:
the time pattern for semi-static target PUCCH cell switching is configured in a unit of uplink slots of the first cell; and
HARQ-ACK reporting on subslots in a slot have a same target PUCCH cell.

28. The method of claim 26, wherein the time pattern for semi-static target PUCCH cell switching is configured in units of an uplink subslot of the first cell.

29. The method of claim 26, wherein:
a HARQ-ACK feedback timing value is indicates in units of subslots of the first cell; and a reference point for applying the HARQ-ACK feedback timing value is a subslot on the first cell in which an ending symbol of the PDSCH or PDCCH occurs.

30. The method of claim 26, wherein switching points in the time pattern between two PUCCH cells occur in conjunction with boundaries of the slot or subslot on the first cell or second cell.

31. The method of claim 26, wherein, if the second cell is selected for transmitting the PUCCH with the HARQ-ACK feedback and a subslot length on the first cell is different than a slot or subslot length on the second cell, the network entity monitors for the PUCCH with the HARQ-ACK feedback in a first slot or subslot on the second cell that overlaps with an uplink slot on the first cell as indicated by a HARQ-ACK feedback timing value.

32. The method of claim 18, wherein:
the target PUCCH cell switching information comprises an indication of a target PUCCH cell transmitted via downlink control information (DCI) in the PDCCH; and
the PUCCH with the HARQ-ACK feedback is transmitted in accordance with a HARQ-ACK feedback timing value based on a slot or subslot length for the first cell or second cell indicated in the DCI as the target PUCCH cell.

33. The method of claim 32, wherein a reference point for applying the HARQ-ACK feedback timing value is a subslot or slot in the target PUCCH cell that overlaps with an end of the PDCCH or PDSCH.

34. The method of claim 32, wherein the signaling configures the first cell for subslot-based HARQ-ACK reporting.

35. An apparatus for wireless communication, comprising:
a memory comprising executable instructions; and
one or more processors configured to execute the executable instructions and cause the apparatus to:
receive signaling configuring a first cell with physical uplink control channel (PUCCH) resources, configuring a second cell with PUCCH resources, and configuring at least one of the first cell or the second cell for subslot-based hybrid automatic repeat request acknowledgment (HARQ-ACK) reporting;
receive a physical downlink control channel (PDCCH);
select, based on target PUCCH cell switching information, the first cell or the second cell as a target PUCCH cell for transmitting a PUCCH with HARQ-ACK feedback for the PDCCH or a physical downlink shared channel (PDSCH) scheduled by the PDCCH; and
transmit the PUCCH with the HARQ-ACK feedback in a subslot or slot on the target PUCCH cell, in accordance with the selection.

36. An apparatus for wireless communication, comprising:
a memory comprising executable instructions; and
one or more processors configured to execute the executable instructions and cause the apparatus to:
transmit, to a user equipment (UE), signaling configuring a first cell with physical uplink control channel (PUCCH) resources, configuring a second cell with PUCCH resources, and configuring at least one of the first cell or the second cell for subslot-based hybrid automatic repeat request acknowledgment (HARQ-ACK) reporting;
transmit a physical downlink control channel (PDCCH) to the UE;

select, based on target PUCCH cell switching information, the first cell or the second cell as a target PUCCH cell for monitoring for a PUCCH with HARQ-ACK feedback for the PDCCH or a physical downlink shared channel (PDSCH) scheduled by the PDCCH; and monitor for the PUCCH with the HARQ-ACK feedback in a subslot or slot on the first cell or the second cell, in accordance with the selection.

* * * * *